(12) United States Patent
Hashimoto

(10) Patent No.: US 11,516,367 B2
(45) Date of Patent: Nov. 29, 2022

(54) READING DEVICE, IMAGE FORMING APPARATUS, IMAGE READING METHOD, AND RECORDING MEDIUM

(71) Applicant: Ayumu Hashimoto, Kanagawa (JP)

(72) Inventor: Ayumu Hashimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/346,307

(22) Filed: Jun. 14, 2021

(65) Prior Publication Data

US 2021/0409566 A1 Dec. 30, 2021

(30) Foreign Application Priority Data

Jun. 25, 2020 (JP) .............................. JP2020-109890

(51) Int. Cl.
*H04N 1/028* (2006.01)
*H04N 1/00* (2006.01)

(52) U.S. Cl.
CPC ..... *H04N 1/02885* (2013.01); *H04N 1/00037* (2013.01); *H04N 1/00082* (2013.01); *H04N 2201/0094* (2013.01)

(58) Field of Classification Search
None
See application file for complete search history.

(56) References Cited

U.S. PATENT DOCUMENTS 6,891,645 B1 * 5/2005 Nakamura ........... H04N 1/1017
355/71
10,924,621 B2 * 2/2021 Nakazawa ........... H04N 1/6027
(Continued)

FOREIGN PATENT DOCUMENTS

JP 2002-057848 2/2002
JP 2007-043427 2/2007
(Continued)

OTHER PUBLICATIONS

U.S. Appl. No. 17/161,704, filed Jan. 29, 2021, Shogo Nakamura, et al.
(Continued)

*Primary Examiner* — Frantz Bataille
(74) *Attorney, Agent, or Firm* — Xsensus LLP

(57) ABSTRACT

A reading device includes a visible light source to irradiate a subject with light having a visible wavelength; an invisible light source to irradiate the subject with light having an invisible wavelength; first and second image sensors to receive reflected light from the subject being irradiated with the light having the visible wavelength and the light having the invisible wavelength, and circuitry. The first image sensor generates visible image data containing a first invisible component, and the second image sensor generates invisible image data of a second invisible component. The circuitry removes the first invisible component contained in the visible image data using the invisible image data. The circuitry multiplies the invisible image data with the correction coefficient that absorbs an individual variation in removal of the first invisible component, and the correction coefficient is generated based on the visible image data and the invisible image.

19 Claims, 15 Drawing Sheets

(56) References Cited

U.S. PATENT DOCUMENTS

| | | | |
|---|---|---|---|
| 2009/0237756 A1* | 9/2009 | Hirokawa | H04N 1/46 358/518 |
| 2014/0169671 A1 | 6/2014 | Choi et al. | |
| 2016/0028920 A1 | 1/2016 | Hashimoto | |
| 2017/0244853 A1 | 8/2017 | Yabuuchi et al. | |
| 2017/0264782 A1 | 9/2017 | Hashimoto | |
| 2018/0139345 A1 | 5/2018 | Goh et al. | |
| 2020/0053229 A1 | 2/2020 | Hashimoto et al. | |
| 2020/0053230 A1 | 2/2020 | Nakazawa et al. | |
| 2020/0137262 A1 | 4/2020 | Kubo et al. | |
| 2020/0244837 A1 | 7/2020 | Tsukahara et al. | |
| 2020/0252513 A1 | 8/2020 | Nakada et al. | |
| 2020/0296255 A1 | 9/2020 | Hashimoto et al. | |
| 2020/0336615 A1 | 10/2020 | Ono et al. | |
| 2021/0021729 A1 | 1/2021 | Hashimoto et al. | |

FOREIGN PATENT DOCUMENTS

| | | |
|---|---|---|
| JP | 2007-202108 A | 8/2007 |
| JP | 2013-121132 A | 6/2013 |

OTHER PUBLICATIONS

Extended European Search Report dated Nov. 15, 2021 in European Patent Application No. 21179175.1, 9 pages.

* cited by examiner

READING DEVICE, IMAGE FORMING APPARATUS, IMAGE READING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2020-109890, filed on Jun. 25, 2020, in the Japan Patent Office, the entire disclosure of which is hereby incorporated by reference herein.

BACKGROUND

Technical Field

The present disclosure relates to a reading device, an image forming apparatus, and a method for reading an image.

Related Art

Conventionally, for the purpose of document security, there has been known an image capturing technique for reading, with invisible light, a document in which invisible information is embedded, so as to determine the authenticity of the document.

There are techniques for improving the quality of a visible image when the visible image and a near-infrared image are read at the same time. For example, a correction coefficient is used for correcting a property difference between a visible sensor and an invisible sensor when removing the effects of near-infrared light from a visible image.

SUMMARY

An embodiment provides a reading device that includes a visible light source configured to irradiate a subject with light having a visible wavelength; an invisible light source to irradiate the subject with light having an invisible wavelength; a first image sensor to receive reflected light from the subject being irradiated with the light having the visible wavelength and the light having the invisible wavelength, to generate visible image data containing a first invisible component; and a second image sensor configured to receive the reflected light from the subject being irradiated with the light having the visible wavelength and the light having the invisible wavelength, to generate invisible image data of a second invisible component different from the first invisible component. The reading device further includes circuitry configured to remove the first invisible component contained in the visible image data using the invisible image data. In removal of the first invisible component from the visible image data, the circuitry multiplies the invisible image data with a correction coefficient that absorbs an individual variation, and the correction coefficient is generated based on the visible image data and the invisible image data together serving as correction coefficient generation image data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
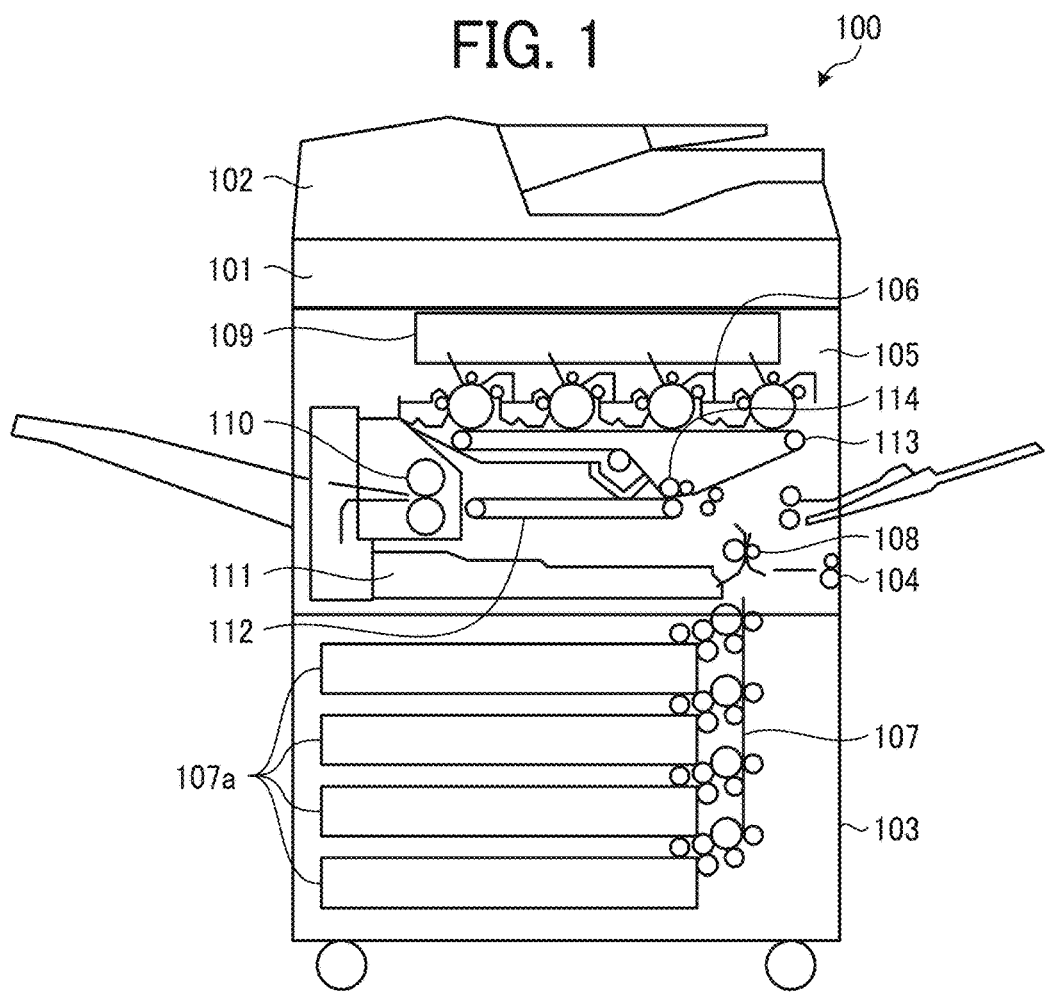
FIG. 1 is a schematic view of an image forming apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, a reading device, an image forming apparatus, and an image reading method according to embodiments of the present disclosure are described below. As used herein, the singular forms "a," "an," and "the" are intended to include the plural forms as well, unless the context clearly indicates otherwise.

A description is given of a first embodiment.

FIG. 1 is a schematic view of an image forming apparatus 100 according to a first embodiment. In FIG. 1, the image forming apparatus 100 is an image forming apparatus that is generally called a multifunction peripheral, printer, or product (MFP) having at least two of copying, printing, scanning, and facsimile functions.

The image forming apparatus 100 includes a scanner 101 serving as a reading device, an automatic document feeder (ADF) 102 atop the scanner 101, and an image forming device 103 below the scanner 101. In order to describe an internal configuration of the image forming device 103, FIG. 1 illustrates the internal configuration of the image forming device 103 from which an external cover is removed.

The ADF 102 is a document support that positions a document (target object) with an image to be read to a reading position. The ADF 102 automatically conveys the document placed on a placement table to the reading position. The scanner 101 reads the document fed by the ADF 102 at the predetermined reading position. The scanner 101 has, on a top side thereof, an exposure glass that is a document support on which a document is placed, and reads the document on the exposure glass that is at the reading position. Specifically, the scanner 101 includes, therein, a light source, an optical system, and an image sensor such as a charge coupled device (CCD). The scanner 101 reads, with the image sensor through the optical system, light reflected from the document irradiated with light from the light source.

The image forming device 103 forms an image according to a document image scanned by the scanner 101. The image forming device 103 includes a bypass feeding roller pair 104 through which a recording medium is manually inserted and a recording sheet feeder 107 that supplies a recording medium. The recording sheet feeder 107 includes an assembly that sends out recording media one by one from vertically-aligned sheet trays 107a. The recording sheet thus supplied is sent to a secondary transfer belt 112 via a registration roller pair 108.

A secondary transfer device 114 transfers a toner image from an intermediate transfer belt 113 onto the recording sheet conveyed on the secondary transfer belt 112.

The image forming device 103 further includes an optical writing device 109, a tandem image forming unit 105 for yellow (Y), magenta (M), cyan (C), and black (K), the intermediate transfer belt 113, and the secondary transfer belt 112. Specifically, in an image forming process, the image forming unit 105 forms an image written by the optical writing device 109, as a toner image, on the intermediate transfer belt 113.

Specifically, the image forming unit (for Y, M, C, and K) 105 includes four photoconductor drums (Y, M, C, and K) in a rotatable manner, and image forming elements 106 around the respective photoconductor drums. The image forming elements 106 include a charging roller, a developing device, a primary transfer roller, a cleaner unit, and a discharger. The image forming element 106 functions on each photoconductor drum, and the image on the photoconductor drum is transferred onto the intermediate transfer belt 113 by each primary transfer roller.

The intermediate transfer belt 113 is in the nips between the photoconductor drums and the corresponding primary transfer rollers and stretched by a drive roller and a driven roller. The toner image primarily transferred onto the intermediate transfer belt 113 is secondarily transferred onto the recording sheet on the secondary transfer belt 112 by a secondary transfer device as the intermediate transfer belt 113 runs. As the secondary transfer belt 112 travels, the recording sheet is conveyed to a fixing device 110, where the toner image is fixed as a color image on the recording sheet. Then, the recording sheet is discharged onto an output tray disposed outside the image forming apparatus 100. In a case of duplex printing, a reverse assembly 111 reverses the recording sheet upside down and sends out the reversed recording sheet onto the secondary transfer belt 112.

The image forming device 103 is not limited to the one that forms an image by an electrophotographic method as described above. The image forming device 103 may be one that forms an image by an inkjet method.

Next, the scanner 101 and the ADF 102 are described.

Figure 2:
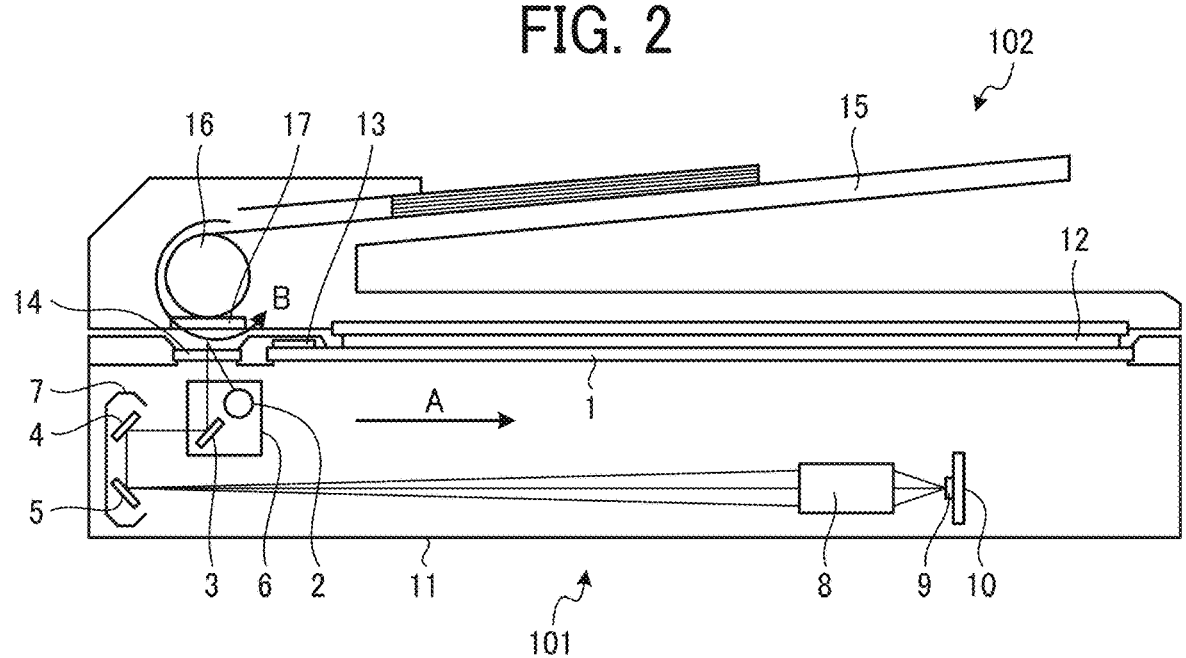
FIG. 2 is a view schematically illustrating a configuration of a scanner (an image reading device) and an automatic document feeder (ADF) of the image forming apparatus illustrated in FIG. 1.

FIG. 2 is a schematic view illustrating configurations of the scanner 101 and the ADF 102. As illustrated in FIG. 2, the scanner 101 includes, in a main body 11, a sensor board 10 on which an image sensor 9 (i.e., an imaging device) is mounted, a lens unit 8, a first carriage 6, and a second carriage 7. The lens unit 8 forms an image on the image sensor 9. The image sensor 9 is, for example, a CCD or complementary metal oxide semiconductor (CMOS) image sensor. The first carriage 6 includes a light source 2, which is a light emitting diode (LED), and a mirror 3. The second carriage 7 includes mirrors 4 and 5.

The scanner 101 is provided with an exposure glass 1 and a reference white plate 13 as a reference member on the upper side of the scanner 101. The reference white plate 13 is long in a main scanning direction, and is used for correcting uneven reading density in the main scanning direction in a reading optical system or the like. The scanner 101 further includes an exposure glass 14 which is a sheet-through reading slit for reading the document conveyed by the ADF 102.

The ADF 102 is coupled to the scanner 101 via a hinge or the like so as to be opened and closed relative to the exposure glass 1.

The ADF 102 includes a document tray 15 as a document placing table on which a document bundle including a plurality of documents can be placed. The ADF 102 further includes a separation-and-feeding unit including a feeding roller 16. The feeding roller 16 separates documents one by one from a document bundle placed on the document tray 15 and automatically feeds the documents toward the exposure glass 14.

Further, the ADF 102 includes a background plate 17 at a position facing the exposure glass 14. The background plate 17 is configured to have a uniform density in the main scanning direction.

When the image forming apparatus 100 configured as described above is in a scan mode for scanning an image side of a document 12 to read an image of the document 12, the scanner 101 emits light from the light source 2 upward while moving the first carriage 6 and the second carriage 7 from the standby positions (home positions) in the sub-scanning direction (indicated by arrow A in FIG. 2). At this time, in order to maintain a constant optical path length from the exposure glass 1 to the image sensor 9, the second carriage 7 moves at half the speed of the first carriage 6. The first carriage 6 and the second carriage 7 cause reflected light from the document 12 to be imaged on the image sensor 9 via the lens unit 8. Then, the signal is output by the photoelectric conversion of the image sensor 9, and is converted into a digital signal by a signal processor on the subsequent stage. As a result, the image of the document 12 is read and a digital image is obtained.

Alternatively, in a sheet-through mode in which the image of the document is read while the document is automatically fed, the scanner 101 moves the first carriage 6 and the second carriage 7 to the position below the exposure glass 14. Then, the feeding roller 16 automatically feeds the document placed on the document tray 15 of the ADF 102 in the direction indicated by arrow B (sub-scanning direction), and the scanner 101 irradiates the document with upward light from the light source 2 at the position of the exposure glass 14. The first carriage 6 and the second carriage 7 cause reflected light from the document 12 to be imaged on the image sensor 9 via the lens unit 8. Then, the image sensor 9 outputs a signal by photoelectric conversion, and the signal is converted into a digital signal by a signal processor on the subsequent stage. Thus, the image of the document conveyed by the ADF 102 is read and digital image data is obtained. The document whose image has been read in this manner is ejected to an outlet.

The scanner 101 reads the reflected light from the reference white plate 13 irradiated by the light source 2 and sets a reference before reading the image in the scan mode, such as when the power is turned on or in the sheet-through mode.

Specifically, the scanner 101 moves the first carriage 6 directly below the reference white plate 13, turns on the light source 2, and causes the reflected light from the reference white plate 13 to be imaged on the image sensor 9. The reflected light from the reference white plate 13 is converted into an analog signal by the image sensor 9, and is converted into a digital signal by the signal processor on the subsequent stage. As a result, the reference white plate 13 is read. Based on the reading result (digital signal), shading correction at the time of reading the image of the document is performed.

Additionally, when the ADF 102 includes a conveyor belt, even in the scan mode, the scanner 101 can read the image of the document automatically fed, by the ADF 102, to a reading position on the exposure glass 1.

In the present embodiment, the scanner 101 reads the reflected light from the object in the description above, but, alternatively, the scanner 101 may read the transmitted light from the object.

Figure 3:
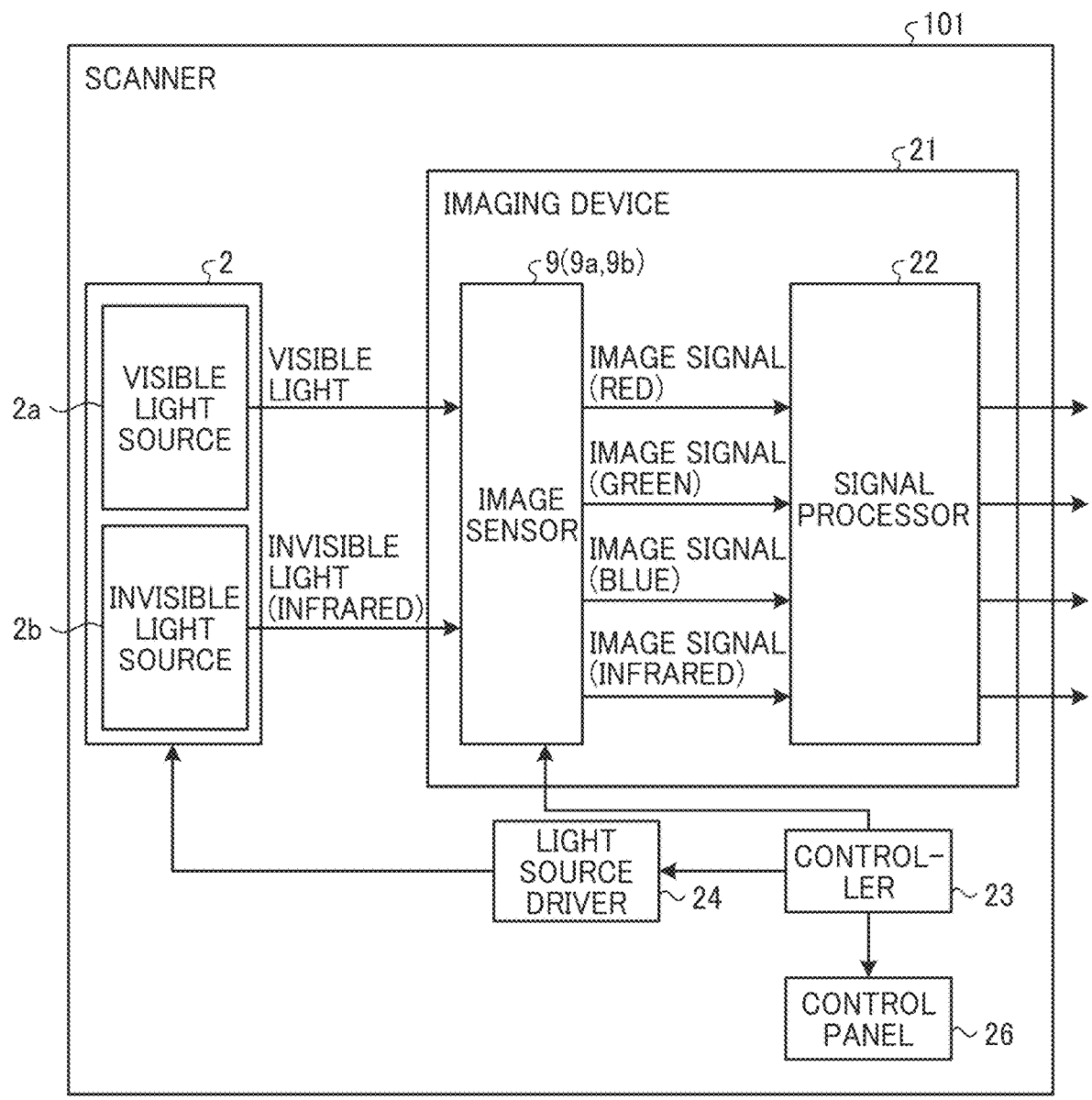
FIG. 3 is a block diagram illustrating electric connections of components of the scanner illustrated in FIG. 2.

FIG. 3 is a block diagram illustrating electric connections of components of the scanner 101. As illustrated in FIG. 3, the scanner 101 includes the light source 2, an imaging device 21, a controller 23, a light source driver 24, and a control panel 26. The light source driver 24 drives the light source 2.

The light source 2 includes a visible light source 2a that mainly emits visible light in the visible wavelength range (red, green, and blue range), and an invisible light source 2b that emits invisible light, such as, near-infrared (NIR) light in the near-infrared (NIR) wavelength range.

Figure 4:
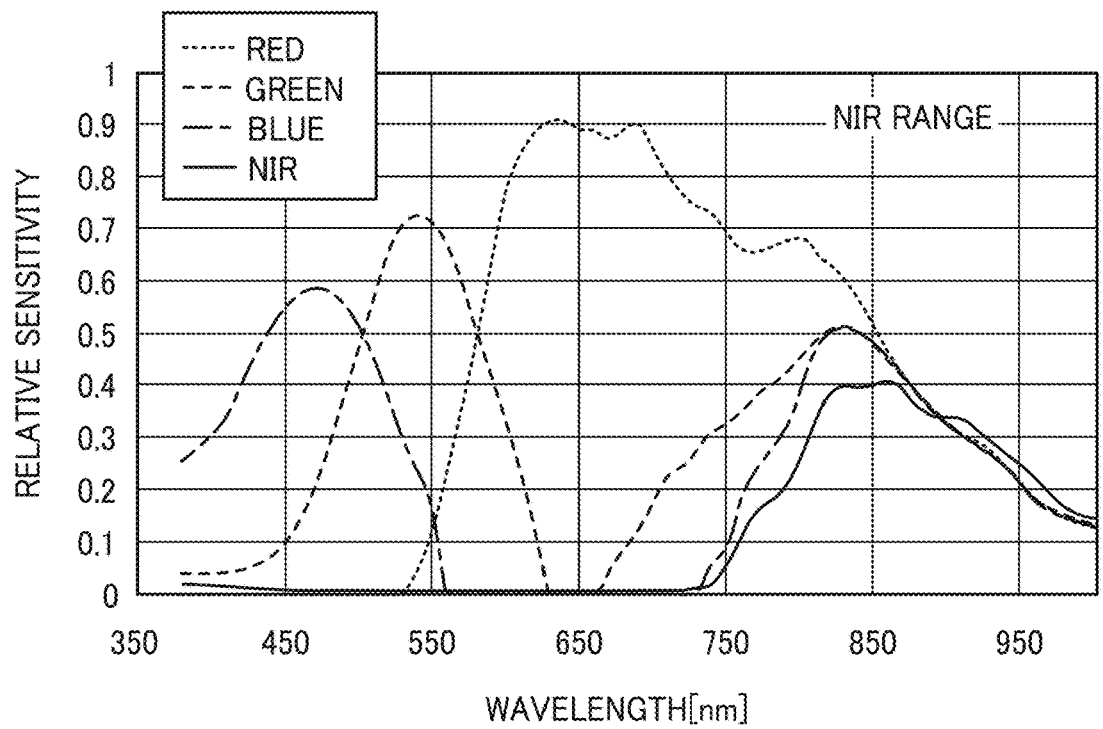
FIG. 4 is a graph of an example of spectral sensitivity properties of an image sensor.

FIG. 4 is a graph of spectral sensitivity properties of an image sensor. As illustrated in FIG. 4, a general silicon image sensor has sensitivity in the near-infrared range (approximately 750 nm to 1100 nm). Therefore, an image sensor of a scanner mounted on a typical multifunction peripheral can capture light in the near-infrared range (approximately 750 nm to 1100 nm), and it is not necessary to prepare a special reading device. Furthermore, since there is no adverse effect on human bodies, the difficulty of introduction of near-infrared light is extremely low in terms of safety.

The imaging device 21 includes the image sensor 9 and a signal processor 22. The image sensor 9 can capture light in visible and invisible wavelength ranges as described above.

The image sensor 9 receives light decomposed from the incident light by a color filter into wavelength ranges of visible light (red, green, and blue) and invisible light (infrared light). The image sensor 9 includes a first image sensor (visible sensor) 9a and a second image sensor (invisible sensor) 9b. The first image sensor 9a converts light into electrical signals of main visible components (red, green, and blue) and a near-infrared component. The second image sensor 9b converts light into an electrical signal of a near-infrared component.

In the present embodiment, a description is given of an example in which a near-infrared (NIR) image is used as the invisible image, but the wavelength range used for the invisible image is not limited to the near-infrared range.

The controller 23 controls the light source driver 24, the image sensor 9, the signal processor 22, and the control panel 26.

Although the details will be described later, the signal processor 22 performs various signal processing on image signals output from the image sensor 9.

The control panel 26 includes a user interface, such as a display, for a user to confirm various information, and a user interface, such as a keyboard, for a user to input information.

Figure 5:
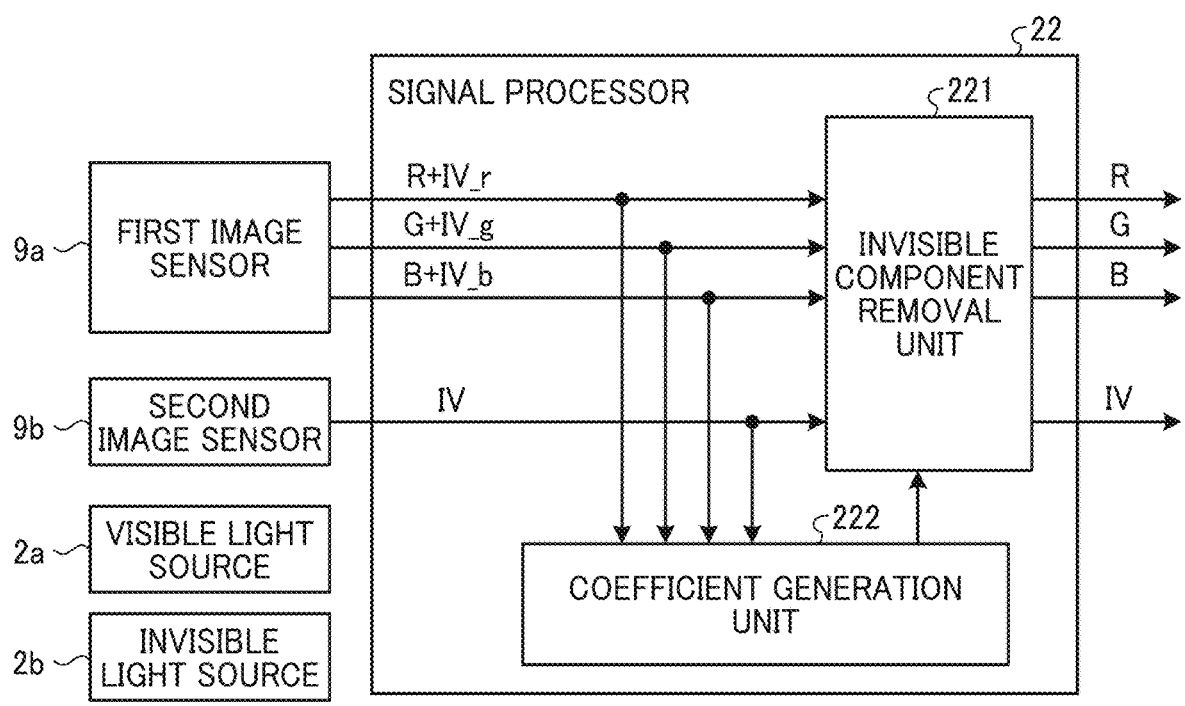
FIG. 5 is a block diagram illustrating a function configuration of the scanner illustrated in FIG. 2.

FIG. 5 is a block diagram illustrating a function configuration of the scanner 101. As illustrated in FIG. 5, the signal processor 22 of the scanner 101 includes an invisible component removal unit 221 and a coefficient generation unit 222. Note that the signal processor 22 can be implemented by either hardware or software.

Roughly speaking, the invisible component removal unit 221 uses a visible image containing an invisible component (a first invisible component) and an invisible image (being a second invisible component), to generate a visible image from which the invisible component has been removed.

Roughly speaking, the coefficient generation unit 222 generates a correction coefficient used by the invisible component removal unit 221.

First, the invisible component removal unit 221 will be described in detail.

The first image sensor 9a is an image sensor for mainly acquiring a visible component. The data read by the first image sensor 9a is an image in which a visible component and an invisible component (the first invisible component) are mixed. On the other hand, the second image sensor 9b is an image sensor for acquiring an invisible component (the second invisible component). The data read by the second image sensor 9b becomes an invisible component image. In order to obtain a visible component image, it is necessary to remove the invisible component contained in the image output from the first image sensor 9a, using the invisible component image output from the second image sensor 9b.

Therefore, the invisible component removal unit 221 executes an invisible component removing process for removing the invisible component from the image output from the first image sensor 9a by Equation 1 below.

$$R = R + IV\_r - (IV \times Kr)$$

$$G = G + IV\_g - (IV \times Kg)$$

$$B = B + IV\_b - (IV \times Kb) \quad \text{Equation 1}$$

where IV represents the image signal output from the second image sensor 9b, Kr, Kg, and Kb represent the correction coefficients for red, green, and blue, respectively, and IV_r, IV_g, and IV_b represent red, green, and blue component signals output from the first image sensor 9a, respectively. For example, "R+IV_r" represents red channel data output from the first image sensor 9a before removal of the invisible component. That is, "R+IV_r" includes the visible component and the invisible component.

Specifically, in Equation 1, the image signals (image data) output from the second image sensor 9b is multiplied by correction coefficients (Kr, Kg, and Kb), and the products of multiplication are respectively subtracted from the red, green, and blue image signals output from the first image sensor 9a. Thus, the invisible component is removed.

Next, the coefficient generation unit 222 will be described in detail.

The coefficient generation unit 222 acquires images for generating the correction coefficients (Kr, Kg, and Kb). More specifically, the coefficient generation unit 222 acquires an image output from the first image sensor 9a and an image output from the second image sensor 9b at the time of coefficient generation, as images for correction coefficient generation. Then, the coefficient generation unit 222 uses the acquired images to generate the correction coefficients (Kr, Kg, and Kb) used in the calculation of removing the invisible component.

Figure 6:
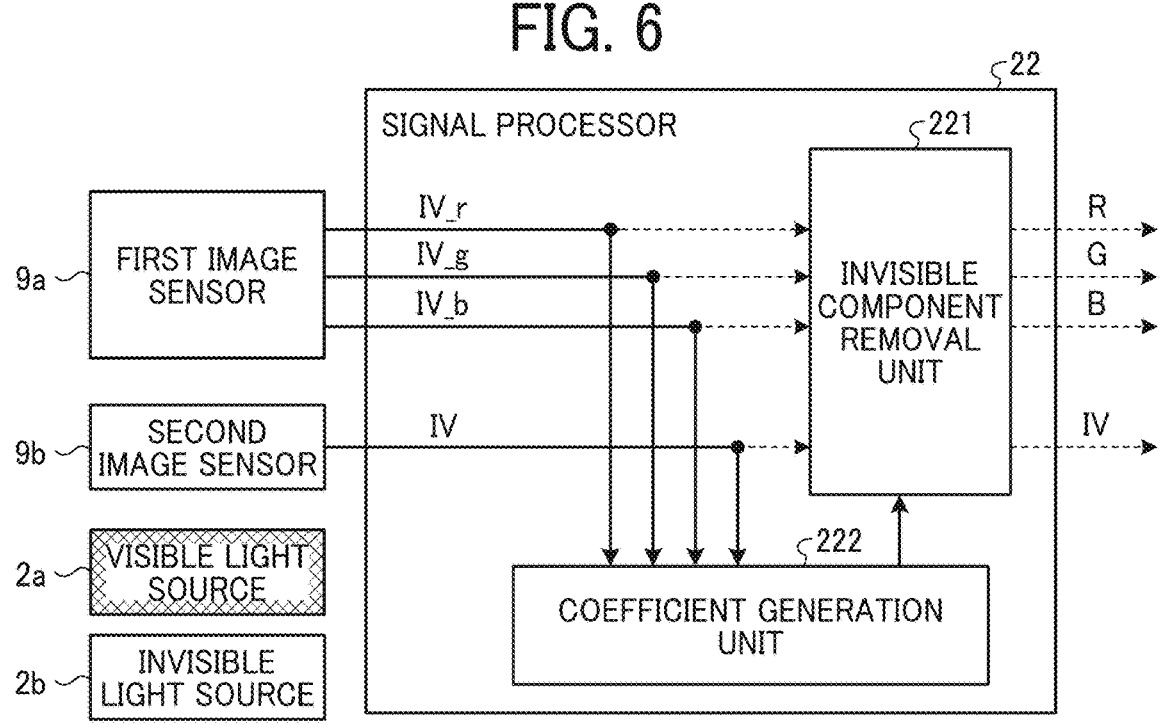
FIG. 6 is a diagram illustrating an operation in generating a correction coefficient.
Figure 7:
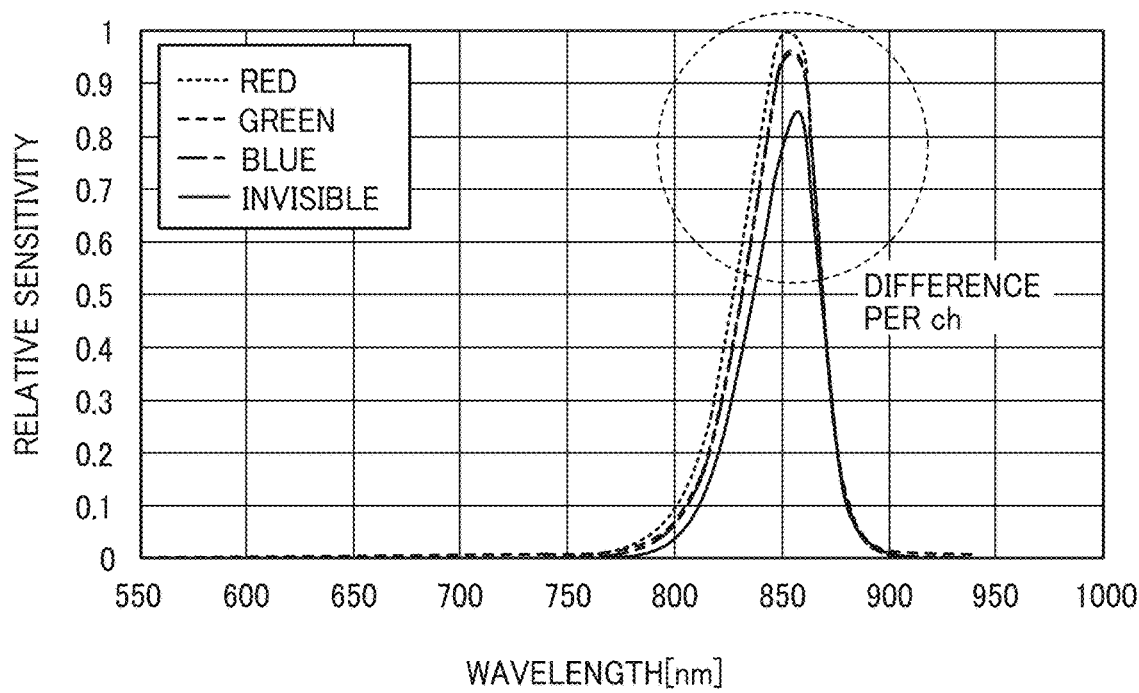
FIG. 7 is a graph illustrating spectral sensitivity properties in an invisible range.

FIG. 6 is a block diagram illustrating the operation for generating the correction coefficients, and FIG. 7 is a graph illustrating the spectral sensitivity properties in the invisible range. Referring to FIG. 6, at the time of generation of the correction coefficients, the invisible light source 2b emits light to the subject that is the reference for generating the correction coefficients. The first image sensor 9a and the second image sensor 9b input, to the coefficient generation unit 222, image signals generated by receiving reflected light of the light of invisible wavelength. Then, the coefficient generation unit 222 generates the correction coefficients (Kr, Kg, and Kb) using the acquired image signals.

In the invisible component removing process performed by the invisible component removal unit 221, it is important to generate a coefficient by which the invisible component contained in the image acquired by the first image sensor 9a is matched the invisible component contained in the image acquired by the second image sensor 9b. Therefore, as illustrated in FIG. 7, it is important to capture the property difference in the invisible range. Such property difference can be captured by using the images acquired by the first and second image sensors 9a and 9b when only the invisible light source 2b is turned on. Noted that "the invisible component contained in the image acquired by the first image sensor 9a is matched the invisible component contained in the image acquired by the second image sensor 9b" is not limited to an exact match, and approximation is sufficient.

Further, in the image signals (image data) acquired by the first image sensor 9a and the second image sensor 9b, the spectral properties of various parts, such as the light source 2, the image sensor 9, the color filter, and the lens in a certain individual are reflected. Therefore, when such images are used in generating the correction coefficients (Kr, Kg, and Kb) for removing invisible components, the correction coefficients (Kr, Kg, and Kb) that absorb individual variations can be generated.

Such an operation can obviate storing the spectral property data for each part. An invisible component can be optimally removed for the individual by acquiring an image in a state where only the invisible light source 2b is turned on. Accordingly, the quality of the visible image from which the invisible component is removed can improve.

Next, the reference white plate 13 will be described.

In order to grasp the properties of the invisible range of each of the image sensors 9a and 9b as illustrated in FIG. 7, the subject for acquiring the image for generating the correction coefficients (Kr, Kg, and Kb) is also important. In order to grasp the properties of the invisible range, desirably, a subject having a high reflectance in the invisible range as much as possible is used. Therefore, in the present embodiment, the reference white plate 13 is used as the subject.

Figure 8:
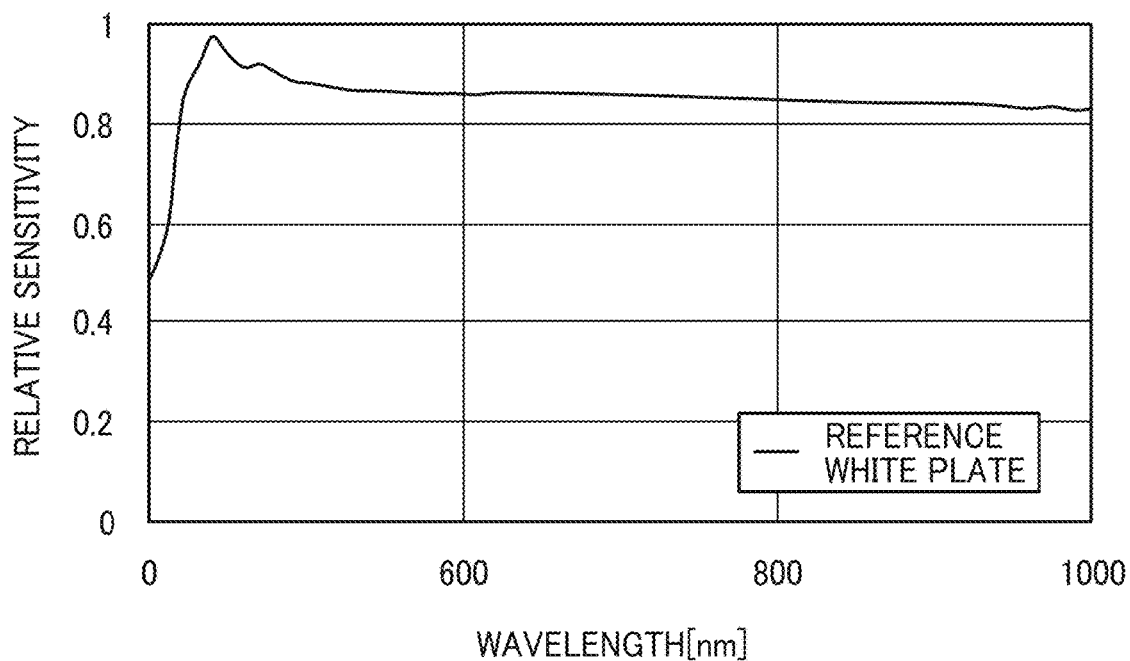
FIG. 8 is a graph illustrating spectral reflectance of a reference white plate (a reference member) of the scanner illustrated in FIG. 2.

FIG. 8 is a graph illustrating the spectral reflectance of the reference white plate 13. As illustrated in FIG. 8, the reference white plate 13 has a high spectral reflectance even in the infrared range. Thus, according to an aspect of the present disclosure, the reference white plate 13 is read, so as to acquire the image used for generating the correction coefficients (Kr, Kg, and Kb). With this configuration, the property difference can be measured in the subject having a large reflection component, and the invisible component can be removed with high accuracy, but the user needs not prepare a subject or needs not set a subject in the reading device.

Next, the calculation of the correction coefficient for each main scanning position will be described.

Figure 9:
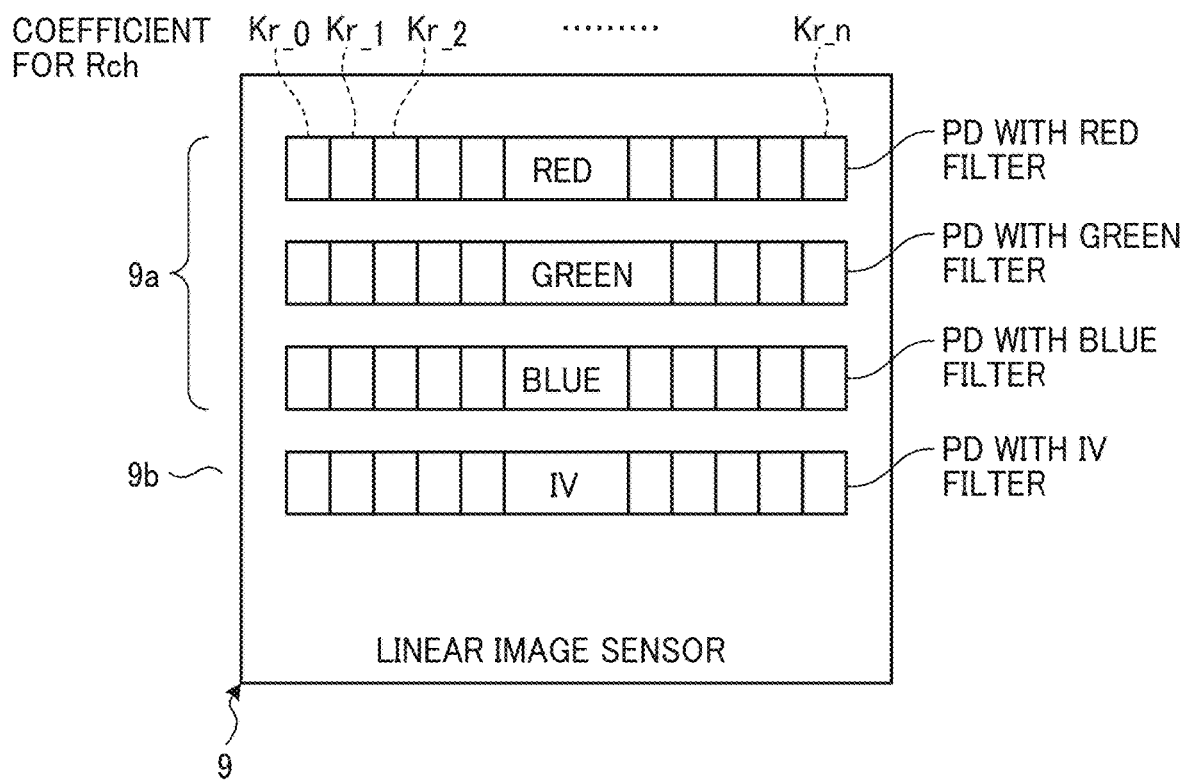
FIG. 9 is a schematic diagram illustrating a configuration of an image sensor of the scanner illustrated in FIG. 2.

FIG. 9 is a diagram illustrating configurations of the image sensor 9 as the combination of the first image sensor 9a and the second image sensor 9b. As illustrated in FIG. 9, the image sensor 9 as the combination of the first image sensor 9a and the second image sensor 9b is a four-line image sensor having sensitivity in red (R), green (G), blue (B), and invisible (IV) ranges. On pixel rows of the image sensor 9 (the first image sensor 9a and the second image sensor 9b in combination), a red (R) filter, a green (G) filter, a blue (B) filter, and an invisible (IV) filter are provided, respectively. Each pixel of the image sensor 9 is, for example, a photodiode (PD). The first image sensor 9a acquires visible images having colors such as R, G, and B. Further, the second image sensor 9b acquires an invisible image.

When the filters are provided as described above, the spectral properties tend to vary from pixel to pixel due to the difference in film thickness and the like. In addition to the spectral property variations due to the image sensor and the color filter, there are spectral property variations by effects of the lens system and variations in the properties of the light source itself in the main scanning direction. Therefore, desirably, the correction coefficient used for removing the invisible component is also different for each main scanning position.

Therefore, in the present embodiment, as illustrated in Equation 2 below, a different correction coefficient is set for each main scanning position, to enable appropriate removal of the invisible component in each pixel.

$$R(x,y)=R+IV\_r(x,y)-(IV(x,y)\times Kr(x))$$

$$G(x,y)=G+IV\_g(x,y)-(IV(x,y)\times Kg(x))$$

$$B(x,y)=B+IV\_b(x,y)-(IV(x,y)\times Kb(x)) \quad \text{Equation 2}$$

In Equation 2, reference character x=0, 1, 2, ... n, and n differs for each main scanning position. Reference character y=0, 1, 2, ... n, and n differs for each sub-scanning position.

The linear image sensor scans the scanning optical system or the document (i.e., a reading target), thereby acquiring image data. Therefore, the input image has different values in the main scanning direction and the sub-scanning direction. Since the linear image sensor reads the reading target with the same pixel in the sub-scanning direction, providing the coefficient for each main scanning position is sufficient. Further, even when the sensor is an area sensor or constructed of a plurality of line sensors, the above configuration can absorb the property differences due to the main scanning position, and the invisible component can be removed more suitably. As a result, variations depending on the main scanning position can be corrected, and the invisible component can be removed with high accuracy.

In addition, both the visible image and the invisible image read by the image sensor 9 (the first image sensor 9a and the second image sensor 9b in combination) have variations in pixel value due to random noise, such as shot noise and dark current noise of the image sensor 9 (the first image sensor 9a and the second image sensor 9b in combination). It is necessary to minimize the influence of such random noise in order to generate a correction coefficient that corrects individual properties differences of the image sensor 9 and the color filter and changes in the properties with elapse of time.

Figure 10:
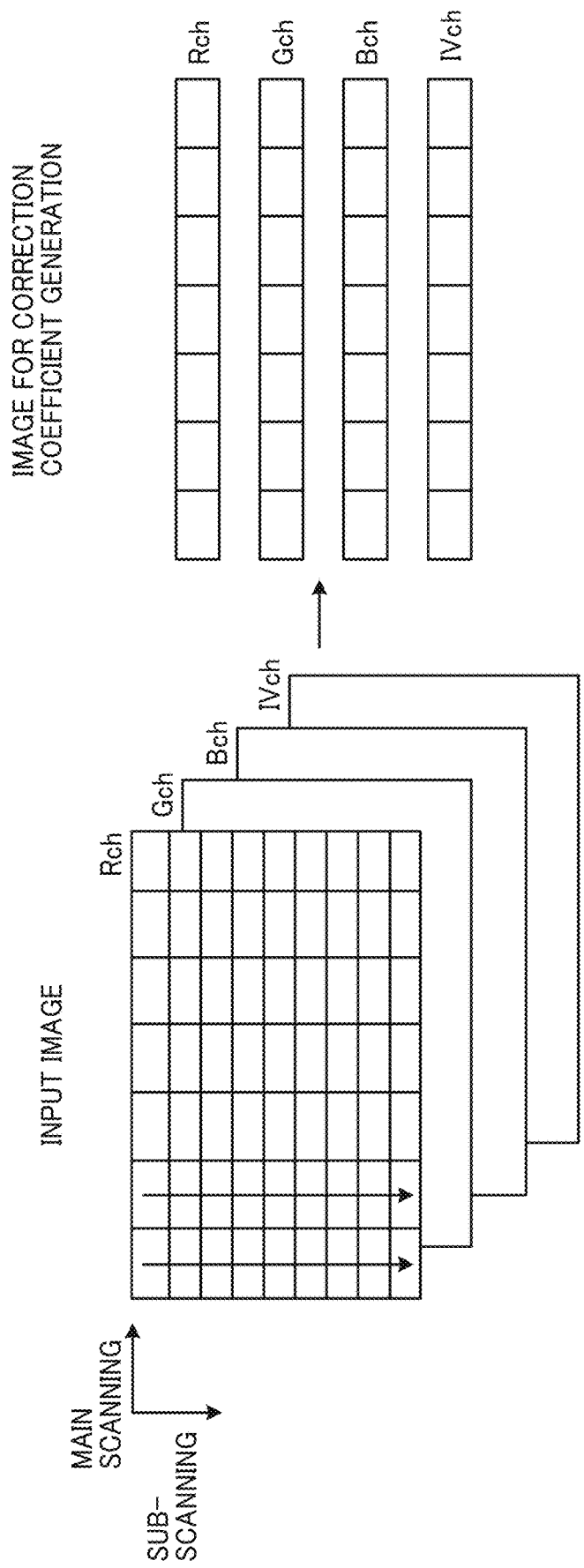
FIG. 10 is a diagram illustrating an image for correction coefficient generation.

FIG. 10 is a diagram illustrating an image for generating the correction coefficient. As illustrated in FIG. 10, the coefficient generation unit 222 takes an average value or a median value of pixels of a predetermined area in the sub-scanning direction to generate an image in which the influence of random noise is reduced, and uses the generated image for generating the correction coefficient. The predetermined area is set, for example, by the manufacturer of the scanner 101 based on, for example, the degree of variations caused by noise.

When a correction coefficient is provided for each main scanning position, it is necessary to limit the direction of the area (in which the average value or the median value is taken) of the image sensor 9 (the first image sensor 9a and the second image sensor 9b in combination) to the sub-scanning direction. Therefore, as illustrated in FIG. 10, the coefficient generation unit 222 limits the area (in which the average value or the median value is taken) of the image sensor 9 (the first image sensor 9a and the second image sensor 9b in combination) in the sub-scanning direction, so as to reduce the effects of the noise while maintaining the component properties for each main scanning position.

Thus, limiting the area (in which the average value or the median value is taken) in the sub-scanning direction can reduce variations in image capture and generate an optimum correction coefficient, for each main scanning position, that corresponds only to variations in component properties.

Next, the generation of the correction coefficient at the start of power supply will be described.

Figure 11:
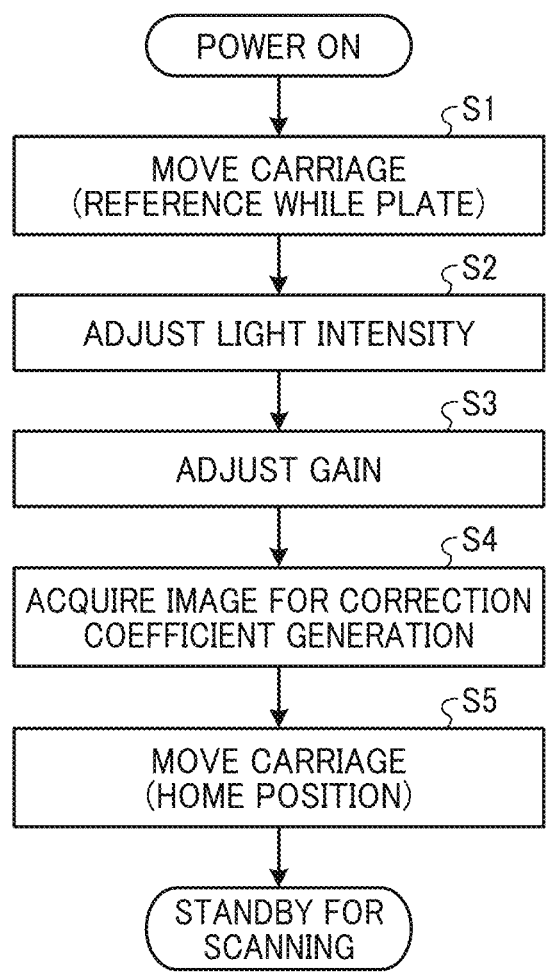
FIG. 11 is a flowchart illustrating an operation of acquiring an image for correction coefficient generation at power-on according to the first embodiment.

FIG. 11 is a flowchart illustrating an operation of image acquisition for correction coefficient generation at the power on. As illustrated in FIG. 11, when the power is turned on, the controller 23 moves the first carriage 6 to the position below the reference white plate 13 (step S1) and performs light intensity adjustment (step S2) and gain adjustment (step S3).

Next, the signal processor 22 acquires an image for correction coefficient generation (correction coefficient generation image data) in step S4 and moves the first carriage 6 to the home position (step S5).

By acquiring the image for correction coefficient generation when the power is turned on in this way, the correction coefficient in which the individual variation of the image sensor 9 is reflected can be generated. Accordingly, the quality of the image from which the invisible component is removed can improve. In addition, the process of acquiring the image for correction coefficient generation can be performed, without spending time, during the copying or scanning operation of the user.

Next, the generation of the correction coefficient after an elapse of a time will be described.

Figure 12A:
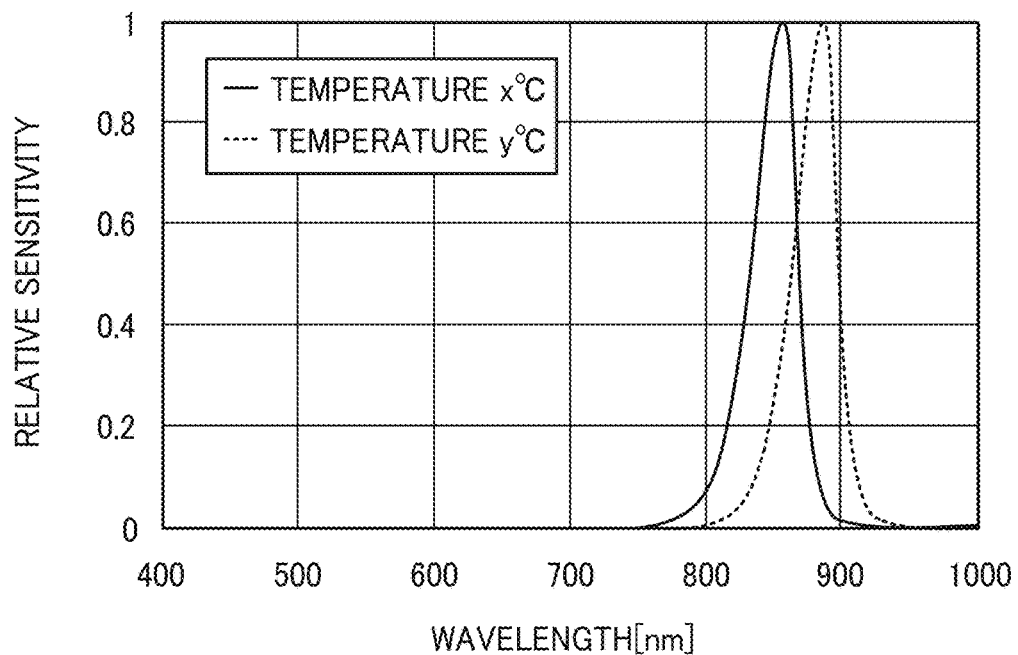
FIGS. 12A and 12B are graphs illustrating influences of temperature fluctuations on an image sensor with elapse of time.
Figure 12B:
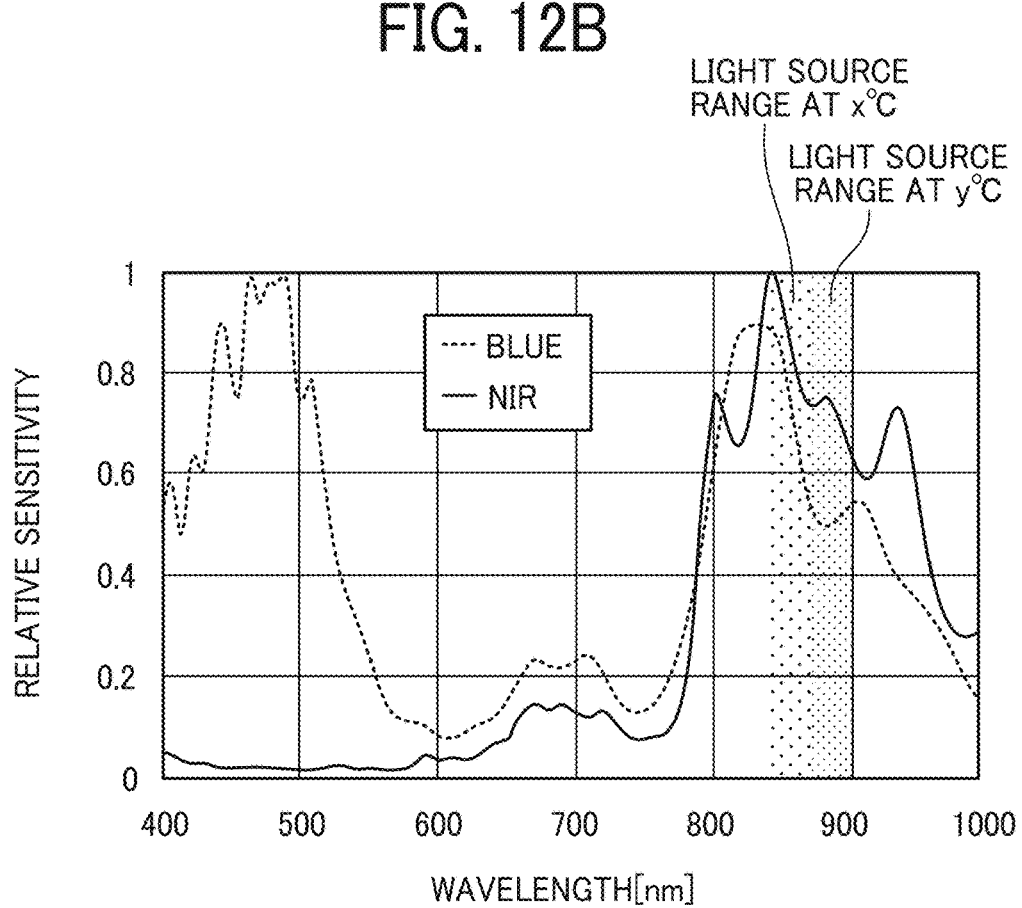

FIGS. 12A and 12B are graphs illustrating influences of temperature fluctuations on the image sensor 9 with elapse of time. FIG. 12A illustrates the properties of the invisible light source 2b, and FIG. 12B illustrates the sensitivity properties of the image sensor 9 including the color filters. FIG. 12B illustrates the properties of blue pixels as visible pixels and illustrates near-infrared pixels as invisible pixels as examples.

As illustrated in FIG. 12A, in the invisible light source 2b having a peaky wavelength spectrum, the peak wavelength changes with a temperature change. When the peak wavelength changes due to the temperature change in this way, the reading properties change significantly.

On the other hand, in the case illustrated in FIG. 12B, the properties change as if the properties oscillate with respect to the wavelength. According to FIG. 12B, when the peak wavelength of the light source changes due to the temperature change in such a case, the output value of the image sensor 9 also changes significantly. That is, in the visible signal and the invisible signal, the relationship of the invisible component changes depending on the temperature change. Further, the sensitivity properties of the image sensor 9 itself may change depending on temperature. In this state, when the invisible component is removed with a certain correction coefficient, the image quality deteriorates.

Therefore, it is necessary to cope with variations due to temperature changes with elapse of time as illustrated in FIGS. 12A and 12B.

Figure 13:
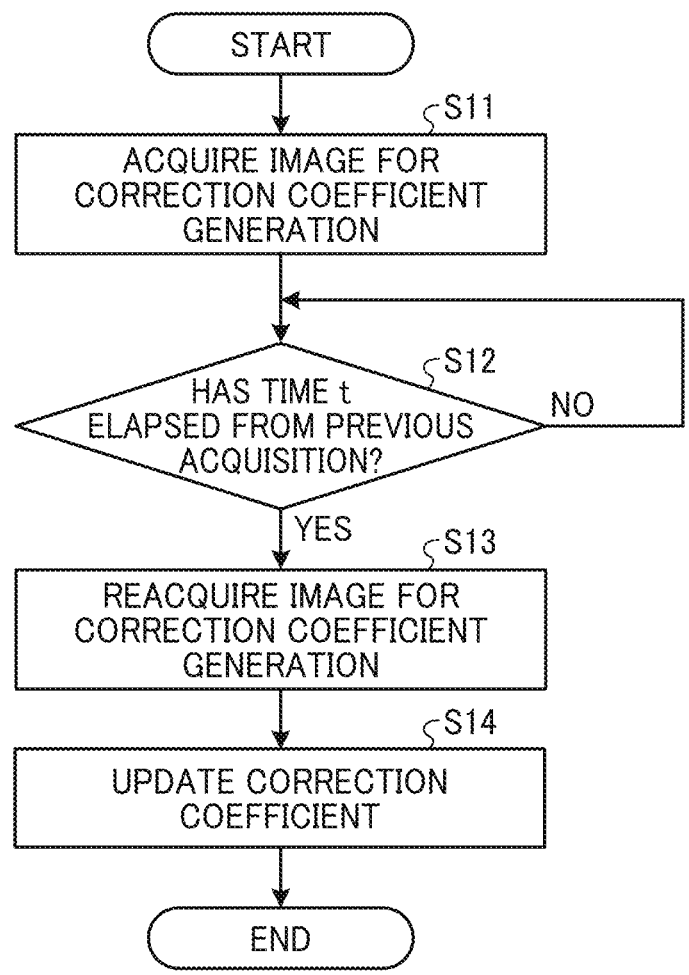
FIG. 13 is a flowchart illustrating operation of updating the correction coefficient with elapse of time according to the first embodiment.

FIG. 13 is a flowchart illustrating the update processing of the correction coefficient with elapse of time. As described above, the temperature of the light source changes with the driving time of the light source. In the present embodiment, after the elapse of a predetermined time period, the coefficient generation unit 222 again acquires an image for correction coefficient generation, to cope with the variations with elapse of time. The predetermined time period is set, for example, by the manufacturer of the scanner 101 based on empirical data.

As illustrated in FIG. 13, the coefficient generation unit 222 acquires an image for correction coefficient generation that is acquired in the previous acquisition (for example, when the power is turned on) (step S11).

Next, the coefficient generation unit 222 determines whether a time period t (predetermined time period) has elapsed from the previous acquisition of the image for correction coefficient generation (step S12).

In response to a determination that the time period t has elapsed from the previous acquisition (Yes in step S12), the coefficient generation unit 222 reacquires the image for correction coefficient generation (step S13). When the time period t has not yet elapsed (No in step S12), the step S12 is repeated.

In step S14, the coefficient generation unit 222 updates the correction coefficient based on the image for correction coefficient generation acquired in step S13.

Thus, the coefficient generation unit 222 updates the correction coefficient according to the temperature fluctuations of the light source 2 and the image sensor 9 with elapse of time. Accordingly, invisible components can be removed while the influence of the fluctuations with elapse of time is reduced. Accordingly, the image quality of the output image can be secured.

As described above, according to the present embodiment, the signal processor 22 acquires the image for correction coefficient generation and, based on the acquired image, generates the correction coefficient for correcting the property difference between the visible image and the invisible image. Accordingly, the signal processor 22 can generate the correction coefficient for correcting a property difference between the first image sensor 9a (the visible sensor) and the second image sensor 9b (the invisible sensor), used in removal of an invisible component from a visible image, without storing data in advance and without setting work. This configuration can reduce the memory and save the work, performed by the user, of inputting the component rank.

Figure 14:
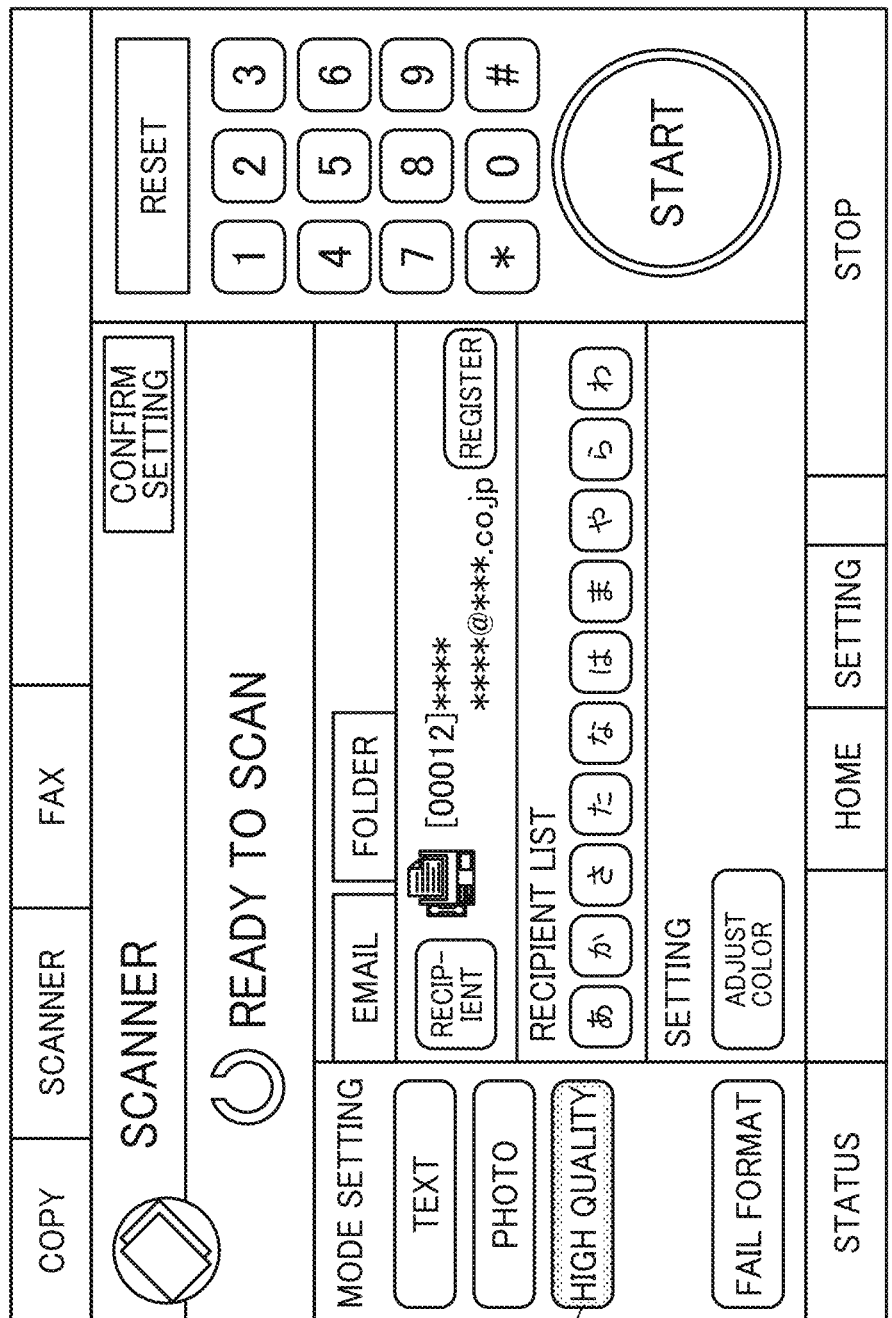
FIG. 14 is a diagram illustrating an example of a mode setting screen.

The coefficient generation unit 222 may change the correction coefficient generation timing according to an image quality mode set by the user. FIG. 14 is a diagram illustrating an example of a mode setting screen. For example, in a normal mode, the correction coefficient is not generated during the reading operation. However, the coefficient generation unit 222 may generate the correction coefficients using the reference white plate 13 without fail before scanning in response to selecting of a mode X (e.g., a high image quality mode) for high image quality on a user interface UI1 illustrated in FIG. 14 on the control panel 26.

As a result, in a case where high image quality is desired even if the productivity is lowered, the correction coefficients are generated without fail, thereby improving the image quality.

Figure 15:
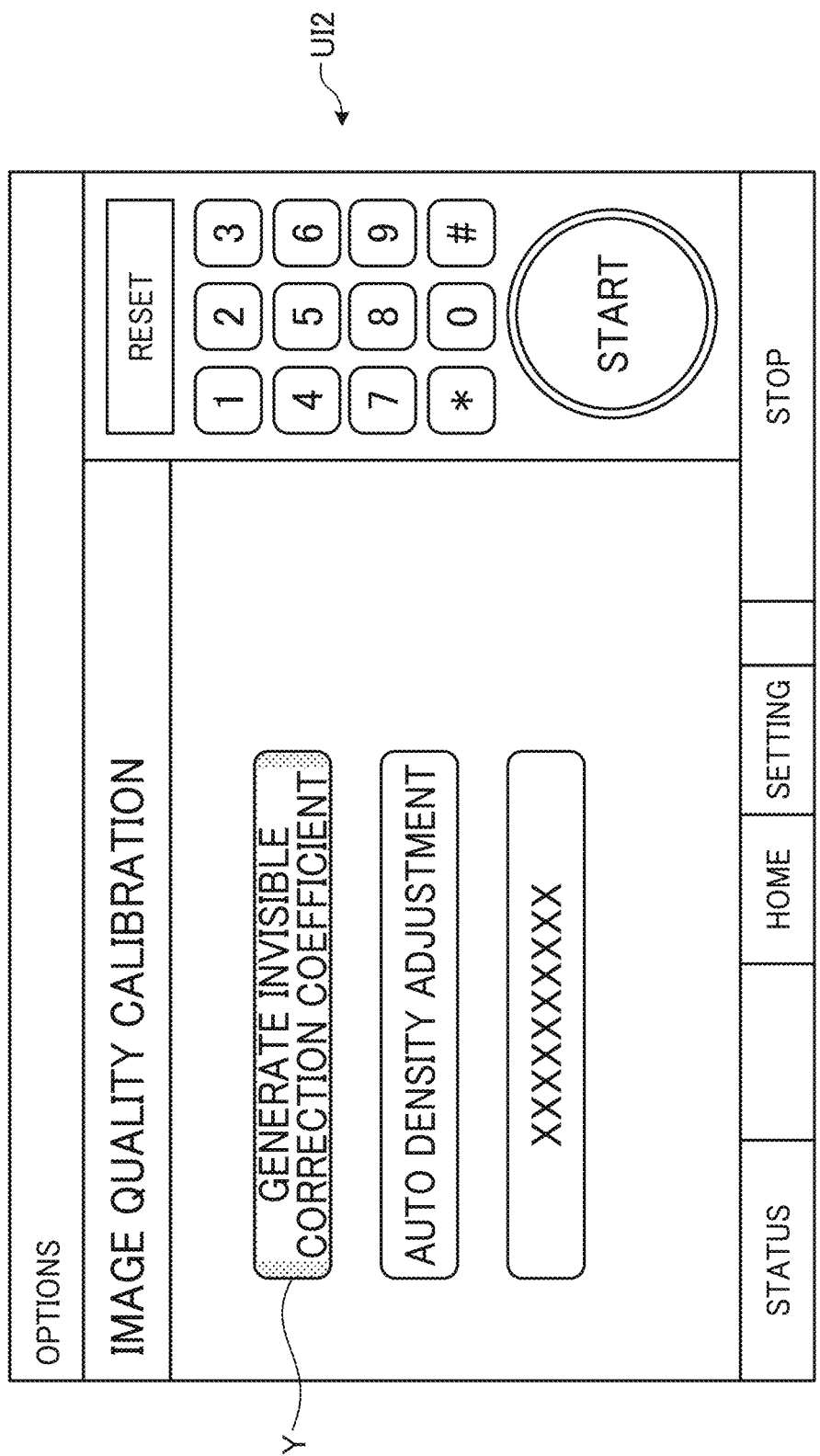
FIG. 15 is a diagram illustrating an example of a calibration screen.

Alternatively, the coefficient generation unit 222 may generate the correction coefficients at a timing set by the user. FIG. 15 is a diagram illustrating an example of a calibration screen. The coefficient generation unit 222 may perform a calibration process for generating the invisible correction coefficients using the reference white plate 13 in response to selecting of a button Y labelled with "Generate invisible correction coefficient" on a user interface UI2 illustrated in FIG. 15 on the control panel 26.

Thus, with the calibration mode, when the user notices an image quality abnormality, the user can easily perform an adjustment at a given timing.

A description is given of a second embodiment of the present disclosure.

The second embodiment is different from the first embodiment in that the image for correction coefficient generation is updated based on the temperature detection of the image sensor 9. In the following description of the second embodiment, descriptions of the same parts as in the first embodiment will be omitted, and portions different from the first embodiment will be described.

Figure 16:
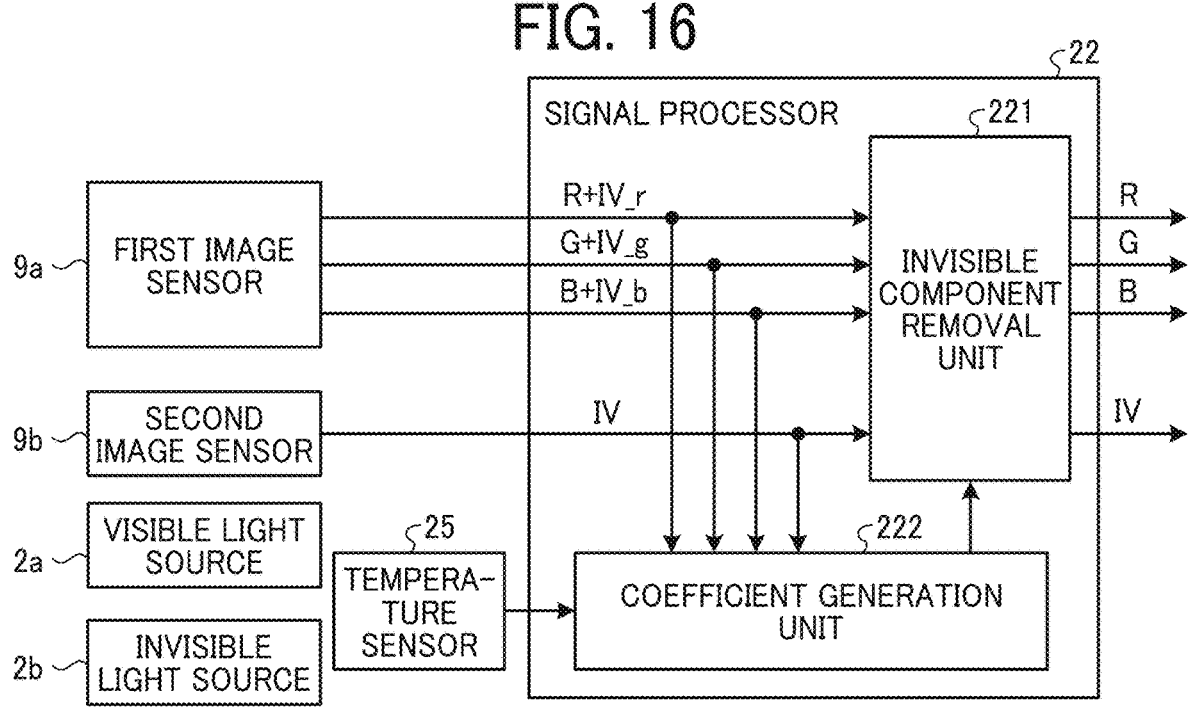
FIG. 16 is a block diagram illustrating a functional configuration of a scanner according to a second embodiment.

FIG. 16 is a block diagram illustrating a functional configuration of the scanner 101 according to the second embodiment. As illustrated in FIG. 16, the scanner 101 includes a temperature sensor 25. The temperature sensor 25 detects the temperature of the image sensor 9.

In response to detection, by the temperature sensor 25, of a temperature change of a certain level or greater, the coefficient generation unit 222 reacquires the image for correction coefficient generation to cope with variations with elapse of time.

As described above, according to the present embodiment, providing the temperature sensor 25 is advantageous as follows. Even when the image sensor 9 has a sharp temperature change, the image for correction coefficient generation can be updated, and the image quality can be maintained.

A description is given of a third embodiment.

The third embodiment is different from the first embodiment and the second embodiment in coping with changes with elapse of time in reading using the ADF 102. In the following description of the third embodiment, descriptions of the same parts as those in the first and second embodiments are omitted, and differences from the first and second embodiments are described.

Figure 17:
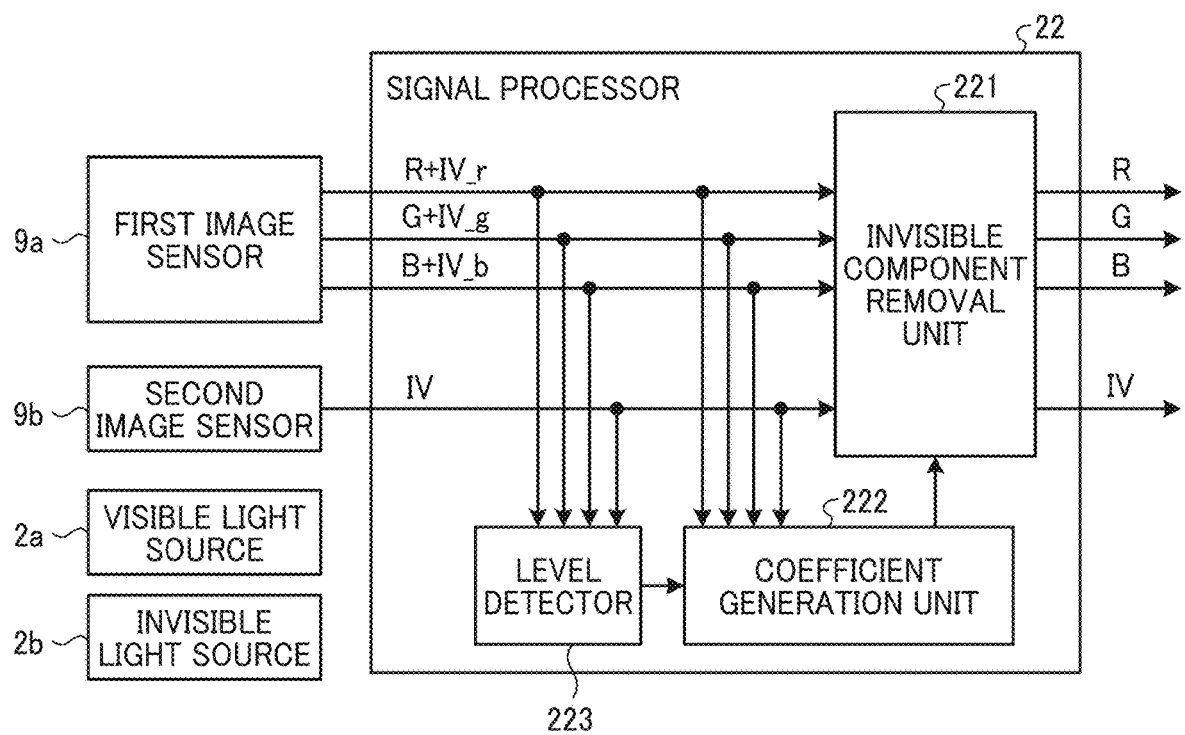
FIG. 17 is a block diagram illustrating a functional configuration of a scanner according to a third embodiment.

FIG. 17 is a block diagram illustrating a functional configuration of the scanner 101 according to the third embodiment. In consecutive document reading in a sheet-through mode using the ADF 102, the first carriage 6 and the second carriage 7 are kept at the reading position, and the scanner 101 reads the image of the document conveyed by the ADF 102 to the reading position. Further, during such consecutive reading, the image sensor 9 is constantly driven and is easily affected by temperature changes and the like.

On the other hand, when the first carriage 6 and the second carriage 7 are moved to the position of the reference white plate 13 during consecutive reading and the correction coefficient used for removing the invisible component is regenerated, the productivity is reduced.

Therefore, in the present embodiment, the scanner 101 acquires the data of the background plate 17, without changing the reading position, and generates the correction coefficient based on fluctuations in the data, so as to improve the accuracy.

Therefore, as illustrated in FIG. 17, the signal processor 22 includes a level detector 223.

The level detector 223 detects the level of data of the background plate 17 read with only the irradiation by the invisible light source 2b (only the invisible light source 2b is turned on) at the timing of acquisition of the image for correction coefficient generation using the reference white plate 13.

In the correction coefficient generation, use of the reference white plate 13 having a high reflectance in any wavelength range is desirable. However, image quality can be maintained responding to fluctuations, while maintaining the productivity, as follows. The scanner 101 reflects, in the acquired data of the image for correction coefficient generation, the change of the level of the background plate 17 at the time of acquisition of the image for correction coefficient generation and after the elapse of a certain period of time.

Figure 18A:
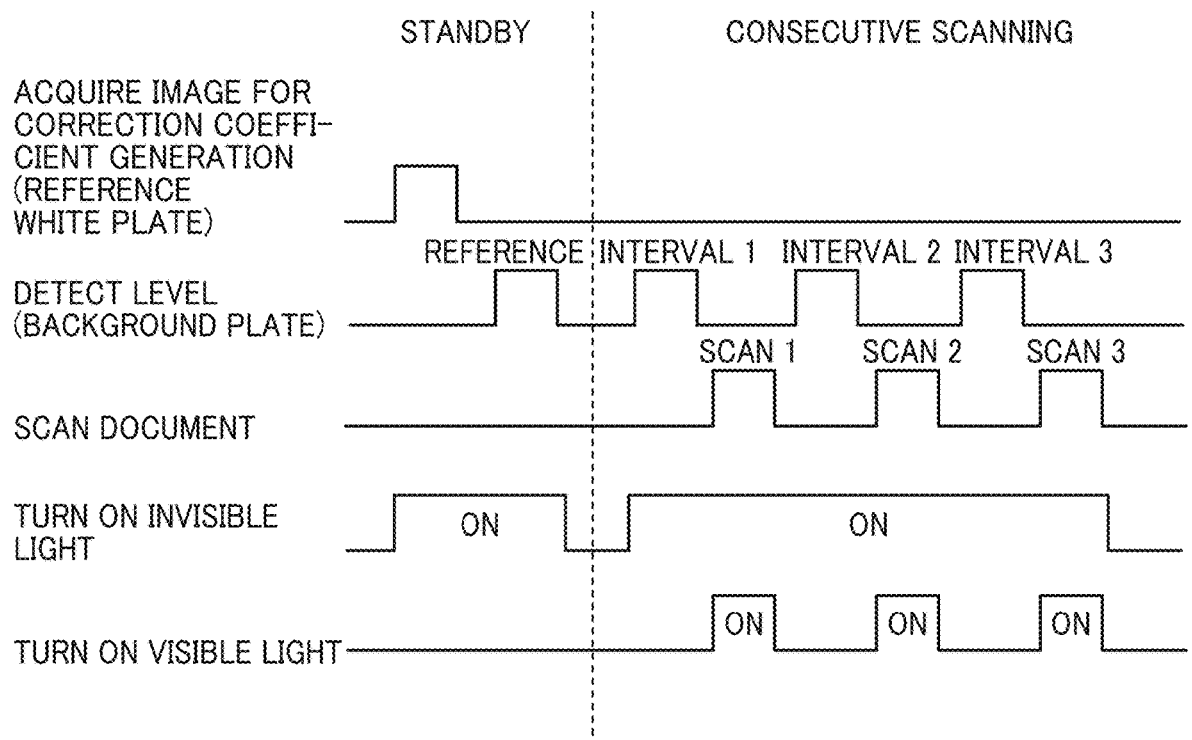
FIGS. 18A and 18B are diagrams illustrating how to cope with fluctuations, using level detection with irradiation by an invisible light source.
Figure 18B:
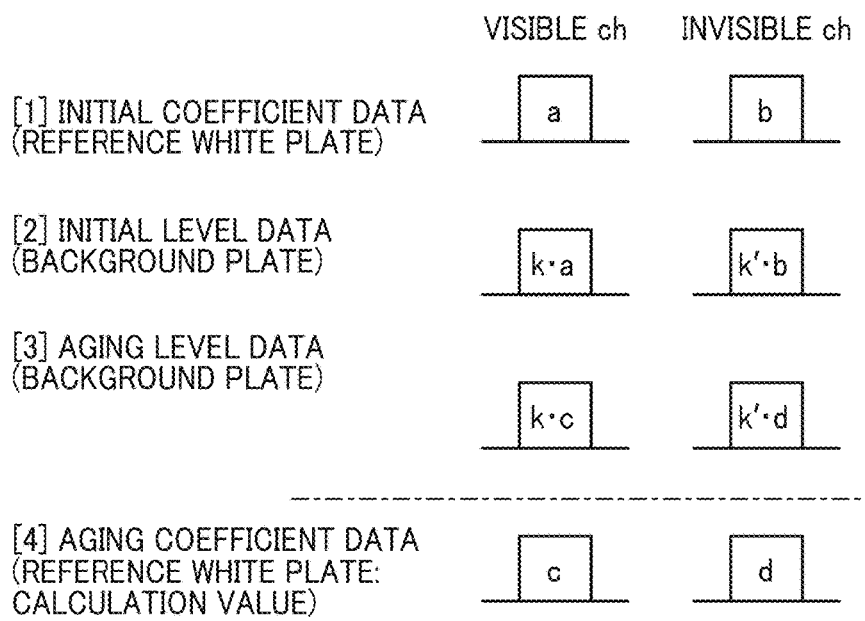

FIGS. 18A and 18B are diagrams illustrating how to cope with fluctuations using level detection with irradiation by the invisible light source 2b. FIG. 18A illustrates data acquisition and turning-on timings of the light sources, and FIG. 18B illustrates a data image.

Referring to FIG. 18A, descriptions are given in detail of the timing of acquiring each data used to generate the correction coefficient and the turning-on timings of the light source. As illustrated in FIG. 18A, first, the level detector 223 detects the level of the data of the background plate 17 immediately after the acquisition of the image for correction coefficient generation using the reference white plate 13. Next, when consecutive scanning of the document is started, before scanning the document and in intervals between scanning one sheet, the data of the background plate 17 is acquired with only the invisible light source 2b turned on. After that, the visible light source 2a is also turned on to read the document.

A method for calculating the correction coefficient from the above-mentioned detection data will be described with reference to FIG. 18B. [1] illustrates the image for correction coefficient generation acquired using the reference white plate 13 at the initial stage. [2] illustrates the level data of the background plate 17 acquired at the initial stage. [3] illustrates aging level data of the background plate 17 acquired after elapse of a time. In FIG. 18B, references characters k and k' represent differences in spectral reflectance between the reference white plate 13 and the background plate 17. From these, the coefficient generation unit 222 calculates aging coefficient generation data ([4] in FIG. 18B) by Equation 3 below.

Data for generation of the aging coefficients of the visible channel: $(k \times c / k \times a) \times a = c$ Data for generation of the aging coefficient of invisible channel: $(k' \times d / k' \times b) \times b = d$     Equation 3

Aging correction coefficient: c/d

In the above example, the data of the background plate 17 is read in each interval between documents, but the reading timing may be once every two scans or once every three scans.

As described above, according to the present embodiment, the scanner 101 can cope with the time-dependent fluctuations without moving the first carriage 6 and the second carriage 7 to the position of the reference white plate 13. Accordingly, both productivity and image quality can be secured.

Next, a description is given of a fourth embodiment.

The fourth embodiment is different from the first to third embodiments in that both the visible light source 2a and the invisible light source 2b are kept on during consecutive document reading in the sheet-through mode. In the following description of the fourth embodiment, descriptions of the same parts as those in the first to third embodiments are omitted, and differences from the first to third embodiment are described.

Figure 19A:
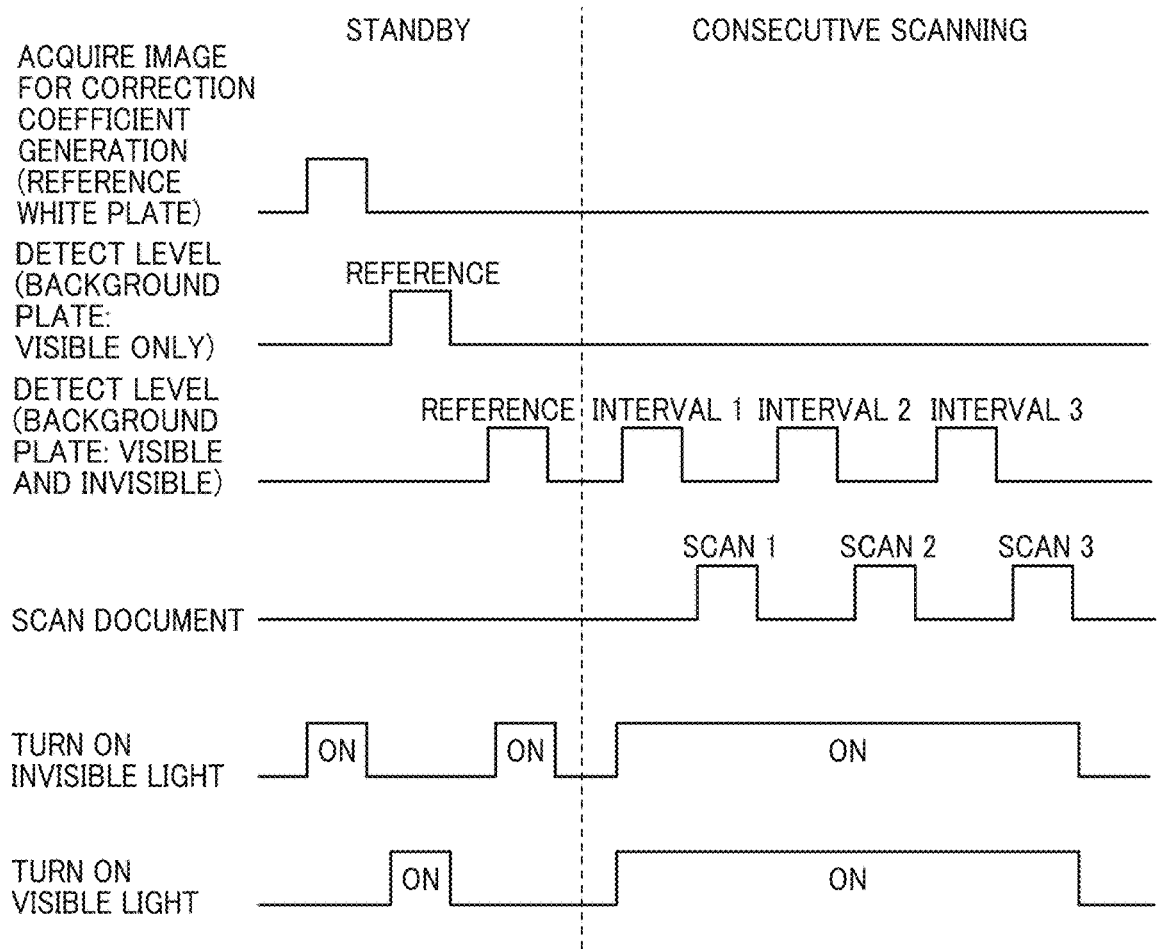
FIGS. 19A and 19B are diagrams illustrating a method for correcting the correction coefficient by level detection with simultaneous irradiation by both light sources, according to the fourth embodiment.
Figure 19B:
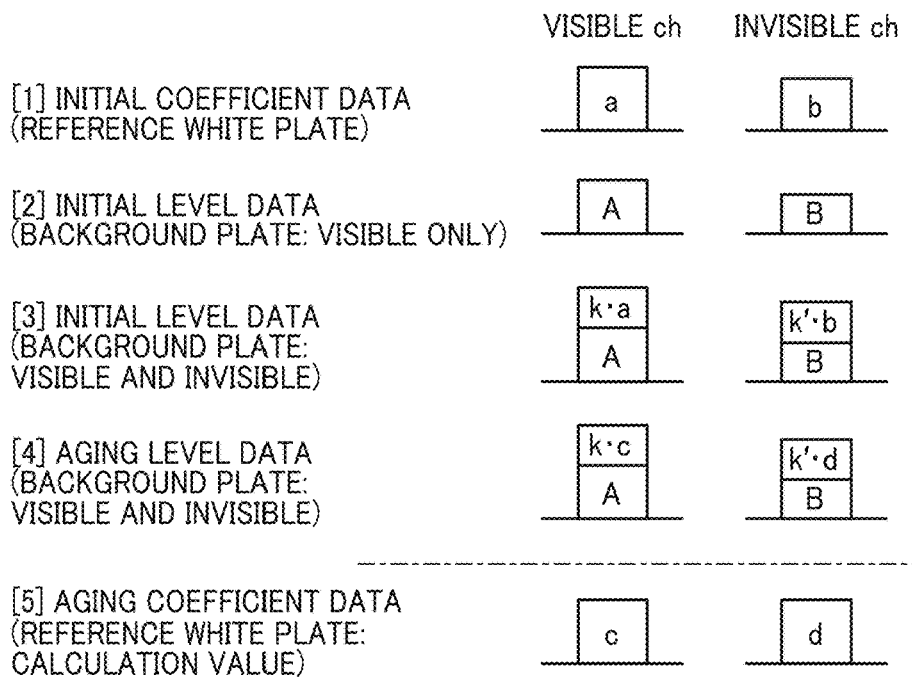

FIGS. 19A and 19B are diagrams illustrating a method for correcting the correction coefficient by level detection with simultaneous irradiation by both light sources, according to the fourth embodiment. FIG. 19A illustrates timing to acquire data and timings to turn the light sources on, and FIG. 19B illustrates a data image.

In the method illustrated in FIGS. 18A and 18B, the background plate 17 is read with invisible light to cope with the time-dependent fluctuations. That is, in the method illustrated in FIGS. 18A and 18B, adverse effects on the productivity due to the reading position change is eliminated by reading the background plate 17 with invisible light. However, the method illustrated in FIGS. 18A and 18B requires time for stabilizing the lighting state since the visible light source 2a is turn on and off.

Therefore, in the present embodiment, as illustrated in FIG. 19A, in order to further increase the productivity, both the visible light source 2a and the invisible light source 2b are kept on during consecutive document scanning in the sheet-through mode.

As illustrated in FIG. 19B, in the present embodiment, as the initial level data of the background plate 17, the scanner 101 acquires two data, namely, the level data of the background plate 17 read with the irradiation by the visible light source 2a only ([2] in FIG. 19B) and level data of the background plate 17 read with simultaneous irradiation by the visible light source 2a and the invisible light source 2b ([3] in FIG. 19B). Then, during consecutive document scanning in the sheet-through mode, the scanner 101 reads the level data of the background plate 17 simultaneously irradiated by the visible light source 2a and the invisible light source 2b between the paper sheets (documents). Since the visible data is not easily affect by time-dependent fluctuations, the coefficient generation unit 222 calculates the data for generating the aging coefficient ([5] in FIG. 19B) by Equation 4 below.

Data for generation of the aging coefficient of the visible channel: $(((k \times c + A) - A)/((k \times a + A) - A)) \times a = c$ Data for generation of the aging coefficient of the invisible channel: $(((k' \times d + B) - B)/((k' \times b + B) - B)) \times b = d$     Equation 4

Aging correction coefficient: c/d

As described above, according to the present embodiment, the scanner 101 can cope with the time-dependent fluctuations without moving the first carriage 6 and the second carriage 7 to the position of the reference white plate 13 and without turning-on switching of the light sources. Accordingly, both productivity and image quality can be secured.

A description is given of a fifth embodiment of the present disclosure.

The fifth embodiment is different from the first to fourth embodiments in coping with abnormality in the level detection. In the following description of the fifth embodiment, descriptions of the same parts as those in the first to fourth embodiments are omitted, and differences from the first to fourth embodiment are described.

Figure 20:
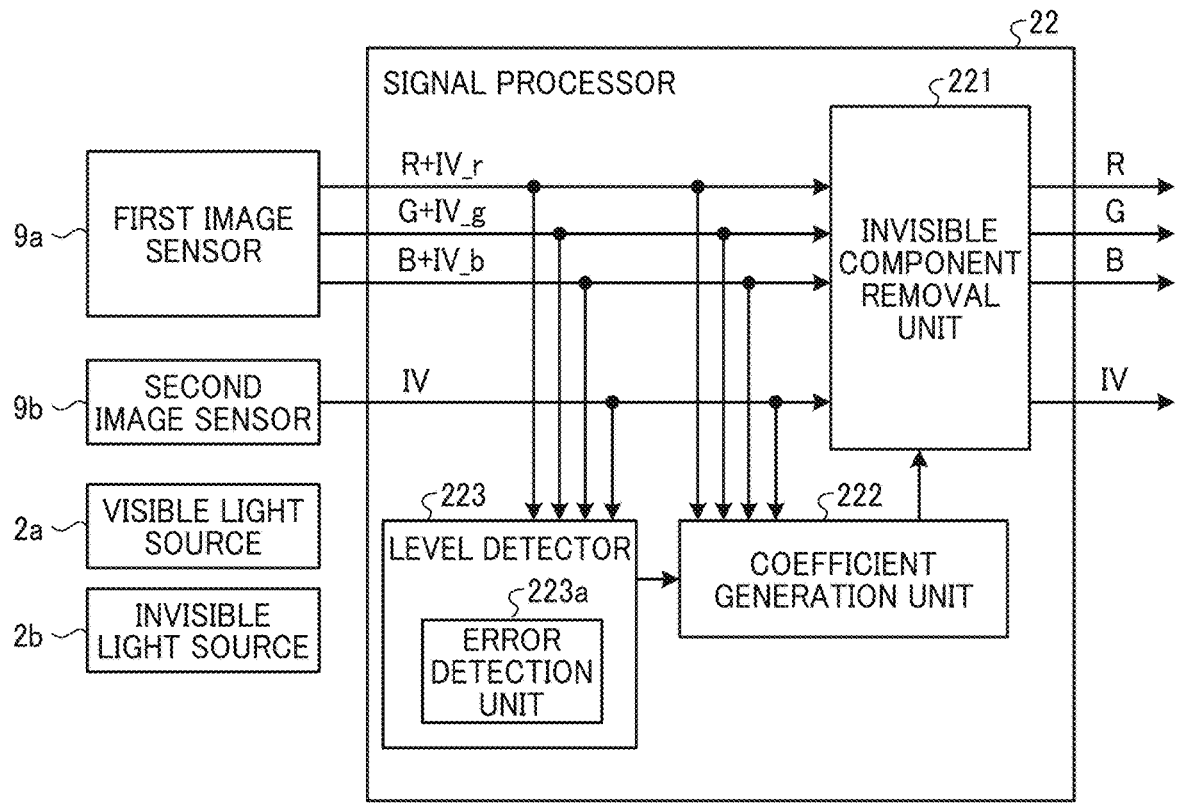
FIG. 20 is a block diagram illustrating a functional configuration of a scanner according to a fifth embodiment.

FIG. 20 is a block diagram illustrating a functional configuration of the scanner 101 according to the fifth embodiment. As illustrated in FIG. 20, the level detector 223 includes an error detection unit 223a therein. The error detection unit 223a detects a sudden change in level.

Figure 21:
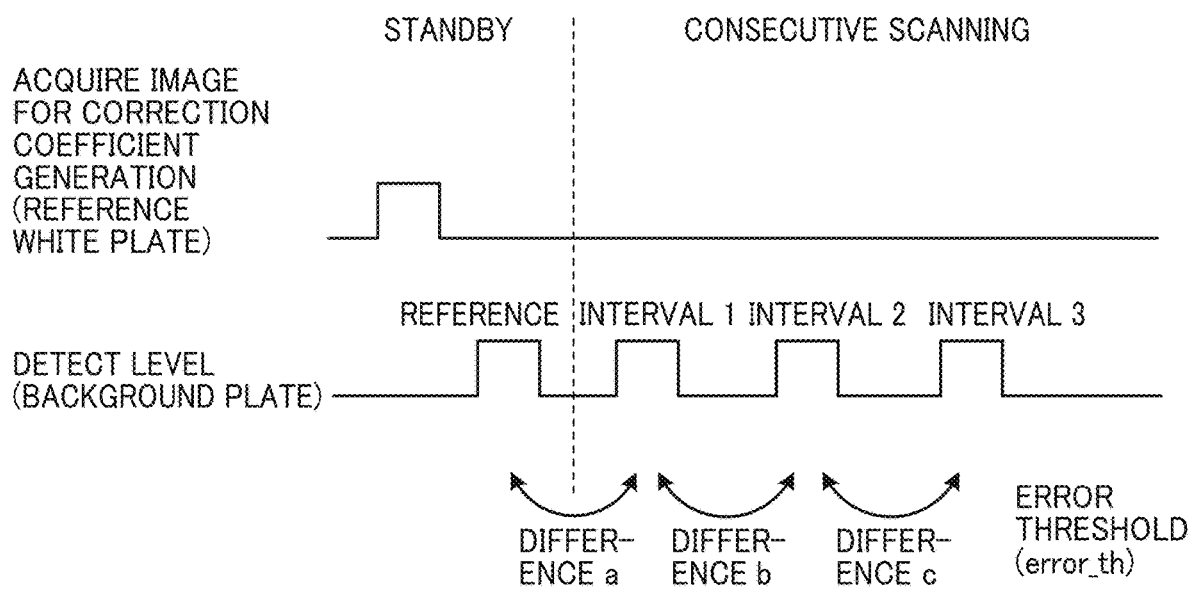
FIG. 21 is a diagram illustrating an example of abnormality processing of a level detection result.

FIG. 21 is a diagram illustrating abnormality processing of the level detection result. As illustrated in FIG. 21, at each detection of the level of the data read from the background plate 17, the error detection unit 223a compares the current level detection result with the previous level detection result and calculates a difference (e.g., differences a, b, and c in FIG. 21). When there is a difference (amount of change) larger than an error threshold value error_th, the error detection unit 223a determines the difference as an error and performs the abnormal processing.

In the abnormality processing, the error detection unit 223a reports the detection abnormality and uses the previously acquired level detection result for generating the correction coefficient, so as to avoid an error.

In the example illustrated in FIG. 21, the current detection result is compared with the previously acquired detection result, but the error detection unit 223a may compare the detection result with a reference level detection result at the time of new level detection, for the abnormality (error) processing. With such error processing, there is an effect of notifying the user of an abnormality and preventing the occurrence of an abnormal image.

As described above, according to the present embodiment, by performing error processing, the user can be notified of an abnormality, and the creating of an abnormal image can be prevented.

Although the image forming apparatus according to the above-described embodiment is an MFP having at least two of copying, printing, scanning, and facsimile transmission, aspects of this disclosure are applicable to an image forming apparatus that is a copier, a printer, a scanner, or a facsimile machine.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A reading device comprising:
a visible light source to irradiate a subject with light having a visible wavelength;
an invisible light source to irradiate the subject with light having an invisible wavelength;
a first image sensor to receive reflected light from the subject being irradiated with the light having the visible wavelength and the light having the invisible wavelength, to generate visible image data containing a first invisible component;
a second image sensor to receive the reflected light from the subject being irradiated with the light having the visible wavelength and the light having the invisible wavelength, to generate invisible image data of a second invisible component different from the first invisible component; and
circuitry configured to remove the first invisible component contained in the visible image data, using the invisible image data,
wherein the circuitry multiples the invisible image data with a correction coefficient that absorbs an individual variation in removal of the first invisible component contained in the visible image data to correct the difference between the invisible component contained in the visible image and the invisible component contained in the invisible image, the correction coefficient being generated based on the visible image data and the invisible image data together serving as correction coefficient generation image data.

2. The reading device according to claim 1,
wherein the circuitry is configured to generate the correction coefficient that corrects the first invisible component contained in the visible image data to match the second invisible component.

3. The reading device according to claim 1,
wherein the circuitry is configured to generate the correction coefficient from image data obtained by reading the subject irradiated with the light having the invisible wavelength emitted from the invisible light source.

4. The reading device according to claim 3, further comprising a reference member to be read by the first image sensor and the second image sensor, for correcting reading density unevenness in a main scanning direction,
wherein the circuitry is configured to generate the correction coefficient from image data obtained by reading the reference member as the subject.

5. The reading device according to claim 1,
wherein the circuitry is configured to generate the correction coefficient for each main scanning position.

6. The reading device according to claim 5,
wherein the circuitry is configured to generate the correction coefficient based on pixels of a predetermined area in a sub-scanning direction of each of the visible image data generated by the first image sensor and the invisible image data generated by the second image sensor.

7. The reading device according to claim 1,
wherein the circuitry is configured to acquire the correction coefficient generation image data at power-on.

8. The reading device according to claim 7,
wherein the circuitry is configured to acquire the correction coefficient generation image data after an elapse of a time from a previous acquisition of the correction coefficient generation image data.

9. The reading device according to claim 7, further comprising a temperature sensor to detect a temperature of the first image sensor and a temperature of the second image sensor,
wherein the circuitry is configured to acquire the correction coefficient generation image data in response to a detection of a temperature change equal to or greater than a threshold based on a detection result of the temperature sensor.

10. The reading device according to claim 1, further comprising a background plate disposed opposite a reading position,
wherein the circuitry is configured to:
detect a level of data read from the background plate at a timing of acquisition of the correction coefficient generation image data using the subject; and
acquire the data read from the background plate in response to a start of consecutive document reading; and
reflect, in the correction coefficient generation image data, a change in the level of the data read from the background plate from when the correction coefficient generation image data is acquired to an elapse of a predetermined time period.

11. The reading device according to claim 10,
wherein the circuitry is configured to:
detect the level of the data read from the background plate irradiated by the invisible light source at the acquisition of the correction coefficient generation image data using the subject, and
acquire the data read from the background plate irradiated by the invisible light source in response to a start of the consecutive document reading.

12. The reading device according to claim 10,
wherein the circuitry is configured to:
detect the level of the data read from the background plate irradiated by the visible light source and the invisible light source at acquisition of the correction coefficient generation image data using the subject, and
acquire the data read from the background plate irradiated by the visible light source and the invisible light source in response to a start of the consecutive document reading.

13. The reading device according to claim 10,
wherein a circuitry is configured to:
detect a sudden change in the level of the data read from the background plate;
compare the level of the data read from the background plate with a previous level of the data at each detection of the level of the data read from the background plate; and perform abnormality processing in response to a detection of a change in the level greater than a threshold.

14. The reading device according to claim 1, wherein the circuitry is configured to switch a generation time of the correction coefficient according to an image quality mode set by a user.

15. The reading device according to claim 1, wherein the circuitry is configured to generate the correction coefficient at a time set by a user.

16. The reading device according to claim 1, wherein the invisible light source is to irradiate the subject with near-infrared light.

17. An image forming apparatus comprising:
the reading device according to claim 1; and
an image forming device to form an image according to data read by the reading device.

18. A method for reading an image, the method comprising:
irradiating a subject with light having a visible wavelength;
irradiating the subject with light having an invisible wavelength;
receiving reflected light from the subject being irradiated with the light having the visible wavelength and the light having the invisible wavelength, to generate visible image data containing a first invisible component;
receiving the reflected light from the subject being irradiated with the light having the visible wavelength and the light having the invisible wavelength, to generate invisible image data of a second invisible component different from the first invisible component; and
removing the first invisible component contained in the visible image data using the invisible image data;
wherein the removing includes multiplying the invisible image data with a correction coefficient that absorbs an individual variation in removal of the first invisible component contained in the visible image data to correct the difference between the invisible component contained in the visible image and the invisible component contained in the invisible image,
the correction coefficient being generated based on the visible image data and the invisible image data together serving as correction coefficient generation image data.

19. A non-transitory recording medium storing a plurality of program codes which, when executed by one or more processors, causes the processors to perform a method, the method comprising:
irradiating a subject with light having a visible wavelength;
irradiating the subject with light having an invisible wavelength;
receiving reflected light from the subject being irradiated with the light having the visible wavelength and the light having the invisible wavelength, to generate visible image data containing a first invisible component;
receiving the reflected light from the subject being irradiated with the light having the visible wavelength and the light having the invisible wavelength, to generate invisible image data of a second invisible component different from the first invisible component; and
removing the first invisible component contained in the visible image data using the invisible image data;
wherein the removing includes multiplying the invisible image data with a correction coefficient that absorbs an individual variation in removal of the first invisible component contained in the visible image data to correct the difference between the invisible component contained in the visible image and the invisible component contained in the invisible image,
the correction coefficient being generated based on the visible image data and the invisible image data together serving as correction coefficient generation image data.

* * * * *